(12) United States Patent
Wang et al.

(10) Patent No.: US 11,741,750 B2
(45) Date of Patent: *Aug. 29, 2023

(54) METHODS AND SYSTEMS FOR FACE ALIGNMENT

(71) Applicant: ZHEJIANG DAHUA TECHNOLOGY CO., LTD., Zhejiang (CN)

(72) Inventors: Bin Wang, Hangzhou (CN); Gang Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,652

(22) Filed: Apr. 10, 2022

(65) Prior Publication Data

US 2022/0237944 A1    Jul. 28, 2022

Related U.S. Application Data

(63) Continuation of application No. 16/925,392, filed on Jul. 10, 2020, now Pat. No. 11,301,668, which is a (Continued)

(30) Foreign Application Priority Data

Jan. 10, 2018  (CN) .......................... 201810021987.3

(51) Int. Cl.
*G06V 40/16* (2022.01)
*G06V 10/50* (2022.01)
(Continued)

(52) U.S. Cl.
CPC .......... *G06V 40/168* (2022.01); *G06F 18/214* (2023.01); *G06F 18/217* (2023.01);
(Continued)

(58) Field of Classification Search
CPC .... G06V 40/165; G06V 10/50; G06V 40/171; G06V 10/7557; G06V 40/168; G06V 40/172; G06K 9/6256; G06K 9/6262
See application file for complete search history.

(56) References Cited

U.S. PATENT DOCUMENTS 9,152,847 B2    10/2015   Zhou et al.
9,633,250 B2    4/2017    Tuzel et al.
(Continued)

FOREIGN PATENT DOCUMENTS

CN    102479388 A    5/2012
CN    102622604 A    8/2012
(Continued)

OTHER PUBLICATIONS

International Search Report in PCT/CN2018/086557 dated Oct. 18, 2018, 4 pages.
(Continued)

*Primary Examiner* — Phuoc Tran
(74) *Attorney, Agent, or Firm* — METIS IP LLC

(57) ABSTRACT

MMTTTTA method and system for face alignment. The method may include obtaining an image processing model set including M (M≥2) candidate models, and obtaining a test image including a target face. The method may also include conducting T (T≥1) stages of model set updating operation. Each stage of the T stages of model set updating operation may include conducting a performance evaluation to each candidate model of the image processing model set with respect to the test image, and updating the image processing model set by excluding at least one model from the image processing model set based on the performance evaluation. The method may further include designating, after completing the T stages of model set updating operation, at least one candidate model of the image processing (Continued)

model set as a target model, and determining, based on the target model, a result shape as a shape of the target face.

20 Claims, 8 Drawing Sheets

Related U.S. Application Data continuation of application No. PCT/CN2018/086557, filed on May 11, 2018.

(51) Int. Cl.
  *G06F 18/214* (2023.01)
  *G06F 18/21* (2023.01)
  *G06V 10/75* (2022.01)

(52) U.S. Cl.
  CPC .......... *G06V 10/50* (2022.01); *G06V 10/7557* (2022.01); *G06V 40/165* (2022.01); *G06V 40/171* (2022.01)

(56) References Cited

U.S. PATENT DOCUMENTS

| | | | |
|---|---|---|---|
| 10,121,055 | B1 | 11/2018 | Savvides et al. |
| 10,528,839 | B2 | 1/2020 | Yao et al. |
| 11,301,668 | B2 * | 4/2022 | Wang .................. G06K 9/6262 |
| 2015/0213058 | A1 | 7/2015 | Ambardekar et al. |
| 2017/0039418 | A1 | 2/2017 | Wang et al. |

FOREIGN PATENT DOCUMENTS

| | | |
|---|---|---|
| CN | 104463233 A | 3/2015 |
| CN | 104504398 A | 4/2015 |
| CN | 105550637 A | 5/2016 |
| CN | 105760836 A | 7/2016 |
| CN | 106096560 A | 11/2016 |
| CN | 106845327 A | 6/2017 |
| CN | 107239736 A | 10/2017 |
| CN | 107506702 A | 12/2017 |
| WO | 2016137169 A1 | 9/2016 |
| WO | 2017149315 A1 | 9/2017 |

OTHER PUBLICATIONS

Written Opinion in PCT/CN2018/086557 dated Oct. 18, 2018, 4 pages.
First Office Action in Chinese Application No. 201810021987.3 dated Oct. 10, 2019, 18 pages.
The Second Office Action in Chinese Application No. 201810021987.3 dated Feb. 25, 2020, 15 pages.
The Extended European Search Report in European Application No. 18899774.6 dated Jan. 27, 2021, 7 pages.
Wang, Zhiwei et al., Joint Face Detection and Initialization for Face Alignment, Big Data Analytics in the Social and Ubiquitous Context: 5th International Workshop on Modeling Social Media, 2016, 12 pages.
Xiong, Xuehan et al., Supervised Descent Method and Its Applications to Face Alignment, 2013 IEEE Conference on Computer Vision and Pattern Recognition (CVPR), 2013, 8 pages.
First Examination Report in Indian Application No. 202017029391 dated Sep. 3, 2021, 9 pages.

* cited by examiner

100

```
┌─────────────────────────────────────────────────┐  110
│ Constructing a plurality of face alignment models│ ∕∿∕
│ corresponding to different postural angle ranges │
└─────────────────────────────────────────────────┘
                        │
┌─────────────────────────────────────────────────┐  120
│ Determining confidence scores of shapes predicted (or│ ∕∿∕
│ determined) by the plurality of face alignment models at│
│                a current stage                  │
└─────────────────────────────────────────────────┘
                        │
┌─────────────────────────────────────────────────┐  130
│   Excluding at least one face alignment model, whose │ ∕∿∕
│    confidence score is lower than a predetermined    │
│   threshold, from the plurality of face alignment models,│
│   and then subjecting remainders of the plurality of face│
│    alignment models to a next stage of the $T$ stages of│
│               shape determination               │
└─────────────────────────────────────────────────┘
                        │
┌─────────────────────────────────────────────────┐  140
│ Determining, based on at least one shape determined at│ ∕∿∕
│    the $T$th stage of the $T$ stages, a result shape of the│
│      target face, wherein the at least one shape is     │
│    determined by the remainders of the plurality of face│
│           alignment models at the $T-1$th stage         │
└─────────────────────────────────────────────────┘
```

310
Assigning an initial shape for a face alignment model corresponding to a postural angle range, wherein the initial shape includes a plurality of landmarks 320
Obtaining a shape feature vector for the initial shape, wherein the shape feature vector includes histogram of oriented gradients (HOG) features associated with all the landmarks of the initial shape.

330
Determining a mapping matrix $W_t$ by solving a linear regression function $\Delta S_t = W_t \varphi_t(I, S_{t-1})$ 340
Updating the initial shape sequentially by $S_t = S_{t-1} + \Delta S_t$, and keeping performing the training until a predetermined termination condition is satisfied.

- 510: For each model in a face alignment model set, retrieving, from a training image set having a corresponding postural angle range, ground truth shapes of the included training images as positive samples for the postural angel range, and distorting the ground truth shapes to generate corresponding negative samples

- 520: For each training image of the training image set, obtaining shape feature vectors of the corresponding positive sample and the corresponding negative sample, respectively, wherein the shape feature vectors are based on HOG features

- 530: Obtaining a projection vector associated with the postural angle range by performing a linear discriminant analysis (LDA) with respect to the obtained positive samples and negative samples

- 540: Performing, based on the projection vector, a vector projection on a shape feature vector of a shape determined, by a face alignment model having a corresponding postural angle range, in the current shape determination stage; obtaining a between-class distance with respect to the classified shape determined based on the shape and the projection vector; and treating the between-class distance as a metric for the confidence score of the face alignment model at the current shape determination stage

FIG. 5

METHODS AND SYSTEMS FOR FACE ALIGNMENT

CROSS REFERENCE TO RELATED APPLICATIONS

This application is a Continuation of U.S. application Ser. No. 16/925,392 filed on Jul. 10, 2020, which is a continuation of International Application No. PCT/CN2018/086557 filed on May 11, 2018, which claims priority of Chinese Application No. 201810021987.3 filed on Jan. 10, 2018, the entire contents of each of which are hereby incorporated by reference.

TECHNICAL FIELD

The present disclosure generally relates to face recognition, and specifically relates to a method and apparatus for face alignment.

BACKGROUND

Face recognition is a popular technology in the field of computer vision and pattern recognition, and it has a wide range of applications in a variety of situations. Some face recognition techniques relies on landmarks (or feature points) of the human face. A landmark may be a point associated with a key part of the human face, such as eyes, eyebrows, and mouth. Landmarks of the human face may be determined via a face alignment operation. The face alignment operation may refer to using an algorithm to determine the position information of key parts of a human face included in an image in the form of a plurality of coordinates, or landmarks.

In normal conditions, a face to be recognized may not always face the camera directly. Usually, due to different postural angles of the face, the eyes and some other parts of the face may be missing in the image captured by the camera, resulting in a poor face alignment result.

In prior art, to perform a face alignment on an image without knowing the postural angle of a face included in the image, a plurality of models corresponding to different postural angles may be constructed, and the plurality of models may be operated separately, and may each determine a face alignment result, leading to a heavy computing burden and a high hardware requirement. Such an approach is difficult to be implemented by a mobile computing device, and is hard to be performed in real-time.

SUMMARY

According to an aspect of the present disclosure, a method for face alignment may include obtaining an image processing model set including M (M≥2) candidate models, and obtaining a test image including a target face. The method may also include conducting T (T≥1) stages of model set updating operation. Each stage of the T stages of model set updating operation may include conducting a performance evaluation to each candidate model of the image processing model set with respect to the test image, and updating the image processing model set by excluding at least one model from the image processing model set based on the performance evaluation. The method may further include designating, after completing the T stages of model set updating operation, at least one candidate model of the image processing model set as a target model, and determining, based on the target model, a result shape as a shape of the target face.

In some embodiments, an ith candidate model of the M candidate models may include $K_i$ (1≤i≤M) levels, wherein $K_i$ ($K_i$≥T+1) is an integer corresponding to the ith candidate model. First T levels of the $K_i$ levels may respectively correspond to the T stages of model set updating operation. A first level of the $K_i$ level may be configured to modify a first shape towards the shape of the target face. Each subsequent level of the $K_i$ levels may be configured to modify the first shape of a previous level towards the shape of the target face. The modified first shape may be the first shape of a current level.

In some embodiments, the conducting the first performance evaluation in a stage of the T stages may include: for each candidate model of the image processing model set, operating a corresponding layer of the candidate model to determine a corresponding first shape associated with the target face, and determining a confidence score based on the first shape.

In some embodiments, in a stage of the T stages, the excluding at least one model from the image processing model set based on the first performance evaluation may include identifying at least one candidate model from the image processing model set that has the confidence score matching a predefined rule associate with the stage, and excluding the at least one candidate model from the image processing model set.

In some embodiments, the determining a confidence score of the first shape in a stage of the T stages may include determining a difference between the first shape and an original version of the first shape, and determining the confidence score of the first shape based on the difference.

In some embodiments, the determining a difference between the first shape and the original version of the first shape may include: retrieving a projection vector associated with the each candidate model; determining, based on the projection vector, a between-class distance between feature vectors of the first shape and the original version of the first shape; and treating the between-class distance as the difference between the first shape and the original version of the first shape.

In some embodiments, the conducting a stage of model set updating operation may include: obtaining the first shape corresponding to each candidate model of the image processing model set; obtaining a weight associated with the each of the first shape; obtaining a second shape corresponding to the stage by determining, based on the obtained weights and the obtained first shapes, a weighted mean of the first shapes; and treating the second shape as an input to the image processing model set in a next stage of the T stages of model set updating operation.

In some embodiments, the method may further include determining the weight associated with the each of the first shape by determining, based on the first performance evaluation of the each of the candidate model, the weight associated with the corresponding first shape.

In some embodiments, the ith candidate model of the M candidate models may be trained using a supervised descent method (SDM) based approach.

In some embodiments, the conducting a stages of model set updating operation may include: for each candidate model of the recognition model set, obtaining the first shape corresponding to the candidate model, and treating the first shape as an input to the candidate model in a next stage of the T stages of model set updating operation.

In some embodiments, each model of the M candidate models may be trained for determining a shape of a face having a postural angle within a predetermined postural angle range, and the each model may be trained with a training image set corresponding to the predetermined postural angle range.

In some embodiments, the second shape may include a plurality of first landmarks. The modifying the first shape in a stage of the T stages of model set updating operation via the ith candidate model may include: generating, for each of the plurality of first landmarks, a first feature vector by extracting features from a patch associated with the each of the plurality of first landmarks, wherein the patch is a part of the test image; generating a second feature vector by concatenating the first feature vectors; determining a shape increment based on the second feature vectors; and modifying the first shape based on the a shape increment.

In some embodiments, the method may further include obtaining a feature index associated with the first shape and determining, for each of the plurality of first landmarks, based on the feature index, a patch on the test image associated with the each of the plurality of first landmarks. The feature index may include an association between the first landmark and a shape/size of the patch.

In some embodiments, the method may further include generating the feature index, which may include retrieving a training dataset including training images and obtaining a set of candidate patch parameters associated with a shape/size of a patch. The generating the feature index may further include, for each first landmark of the plurality of first landmarks: conducting a second performance evaluation of the set of candidate patch parameters for the each first landmark with respect to the training images using an evaluation model; selecting, based on the second performance evaluation, a target patch parameter from the set of candidate patch parameters for the each first landmark; and generating an association to be included in the feature index between the target patch parameter and the first landmark. The evaluation model may evaluate the candidate patch parameters based on an invariance of first feature vectors resulting from each of the set of candidate patch parameters.

In some embodiments, the evaluation model may include at least one decision tree, and the conducting the second performance evaluation may include training the at least one decision tree using a maximum variance reduction approach.

In some embodiments, the features extracted for generating the first feature vector may be histogram of oriented gradient (HOG) based feature.

In some embodiments, the method may further include obtaining a feature index associated with the first shape, and determining, for each of the plurality of first landmarks, based on the feature index, a feature type associated with the first landmark. The feature index may include an association between the first landmark and the feature type, and a type of the features extracted from the associated patch for generating the first feature vector of the first landmark may be the determined feature type.

According to another aspect of the present disclosure, a method for face alignment may include obtaining a plurality of face alignment models. Each of the plurality of face alignment models may be trained for determining a shape of a face having a postural angle within a predetermined posture angle range. The method may also include conducting T (T≥1) stages of shape determination on a test image including a target face. Each stage of the T stages of shape prediction operation may include determining confidence scores of shapes determined by the plurality of face alignment models based on the test image, and excluding at least one model from the plurality of face alignment models, the at least one model having the confidence score lower than a predetermined threshold; and subjecting remainder models of the plurality of face alignment models to a next stage of the T stages of shape determination. The method may further include determining based on at least one shape determined at a Tth stage of the T stages of shape determination, a result shape of the target face, wherein the at least one shape is determined by the remainder models of the plurality of face alignment models at the T−1th stage of the T stages of shape determination.

In some embodiments, the obtaining a plurality of face alignment models may include, for each of the plurality of face alignment models, obtaining a training image set corresponding to the predetermined postural angle range of the each face alignment model, and performing T stages of training on the each face alignment model with the training image set using a supervised descent method (SDM) based approach.

In some embodiments, the training the each face alignment model may include: assigning an initial shape for the each face alignment model, wherein the initial shape may include a plurality of landmarks; obtaining a shape feature vector for the initial shape, wherein the shape feature vector may include histogram of oriented gradients (HOG) features associated with all the landmarks of the initial shape; determining a mapping matrix $W_t$ by solving a linear regression function $\Delta S_t = W_t \varphi_t(I, S_{t-1})$, wherein $\varphi_t$ is an index feature function, I is a matrix of a training image of the training image set, $S_{t-1}$ is a shape determined by a t−1th level of the each face alignment model corresponding to a t−1th stage of the T stages of training, and $\Delta S_t$ is a difference between $S_{t-1}$ and a ground truth shape associated with I during the training of the each face alignment model; updating the initial shape by $S_t = S_{t-1} + \Delta S_t$ sequentially; and keeping performing the training of the each face alignment model until a predetermined condition is satisfied.

In some embodiments, the obtaining a shape feature vector for the initial shape may include: selecting, according to a predetermined sequence, a landmark from the initial shape; determining, for the landmark, a plurality of candidate patches with different radii as a plurality of multi-scaled patches; generating a plurality of HOG feature descriptors by extracting HOG features from the multi-scaled patches; determining HOG feature vectors based on the HOG feature descriptors; conducting a feature selection by inputting the candidate feature vectors into at least one decision tree having a depth of 1; and selecting an HOG feature corresponding to a radius causing a minimum variance of the generated feature vectors with respect to the training image set as a multi-scaled HOG feature of the landmark.

In some embodiments, the determining confidence scores of shapes determined by the plurality of face alignment models based on the test image may include, for each model in the face alignment model set: retrieving, from the corresponding training image set, ground truth shapes of the included training images as positive samples; generating corresponding negative samples by distorting the ground truth shapes; obtaining, for each training image of the training image set, shape feature vectors of the corresponding positive samples and the corresponding negative samples, respectively, wherein the shape feature vectors may be based on HOG features; obtaining a projection vector associated with the each model by performing a linear discriminant analysis (LDA) with respect to the obtained positive samples and negative samples based on the obtained shape feature vectors; performing, based on the projection vector, a vector projection on a shape feature vector of a shape determined, by the each model, in a stage of the T stages of shape determination; obtaining a between-class distance with respect to a classified shape determined based on the shape and the projection vector; and treating the between-class distance as a metric for the confidence score of the each model at the stage of the T stages of shape determination.

In some embodiments, the selecting an HOG feature corresponding to a radius causing a minimum variance of the generated feature vectors with respect to the training image set as the multi-scaled HOG feature of the landmark may include generating an association to be included in a feature index between the radius of the patch and an index number of the landmark. The obtaining shape feature vectors of the corresponding positive samples and the corresponding negative samples may include determining, based on the feature index, for each landmark of the positive sample and the negative sample, a multi-scaled HOG feature associated with the each landmark. The shape feature vectors of the positive samples and the negative samples are based on multi-scaled HOG features of the each landmark.

According yet to another aspect of the present disclosure, a system for face alignment may include a storage medium and at least one processor in communication with the storage medium. The storage medium may include a set of instructions. When executing the set of instructions, the at least one processor may be configured to cause the system to obtain an image processing model set including M (M≥2) candidate models, and obtain a test image including a target face. The system may be also caused to conduct T (T≥1) stages of model set updating operation. In each stage of the T stages of model set updating operation, the system may be caused to conduct a first performance evaluation to each candidate model of the image processing model set with respect to the test image, and update the image processing model set by excluding at least one model from the image processing model set based on the first performance evaluation. The system may be further caused to designate, after completing the T stages of model set updating operation, at least one candidate model of the image processing model set as a target model, and determine, based on the target model, a result shape as a shape of the target face.

According yet to another aspect of the present disclosure, a non-transitory computer readable medium may include instructions, that when executed by a processor, may cause the processor to execute operations. The operations may include obtaining an image processing model set including M (M≥2) candidate models, and obtaining a test image including a target face. The operations may also include conducting T (T≥1) stages of model set updating operation. Each stage of the T stages of model set updating operation may include conducting a performance evaluation to each candidate model of the image processing model set with respect to the test image, and updating the image processing model set by excluding at least one model from the image processing model set based on the performance evaluation. The operations may further include designating, after completing the T stages of model set updating operation, at least one candidate model of the image processing model set as a target model, and determining, based on the target model, a result shape as a shape of the target face.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary process for face alignment according to some embodiments of the present disclosure;

FIG. 3 is a schematic diagram illustrating an exemplary process for training a face alignment model according to some embodiments of the present disclosure;

FIG. 5 is a schematic diagram illustrating an exemplary process for determining a confidence score for a face alignment model according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Figure 7:
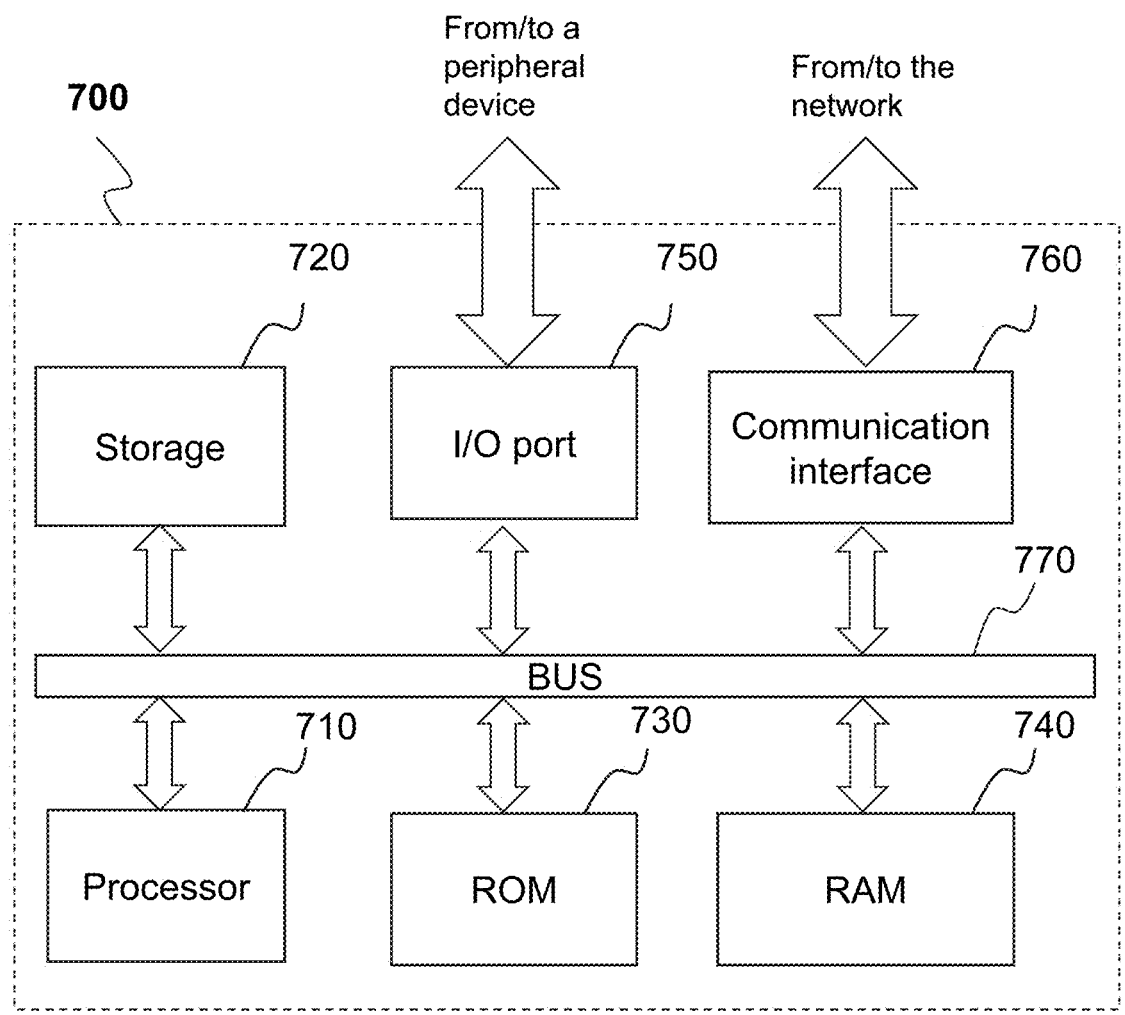
FIG. 7 is a schematic diagram illustrating an exemplary computing device.
Figure 8:
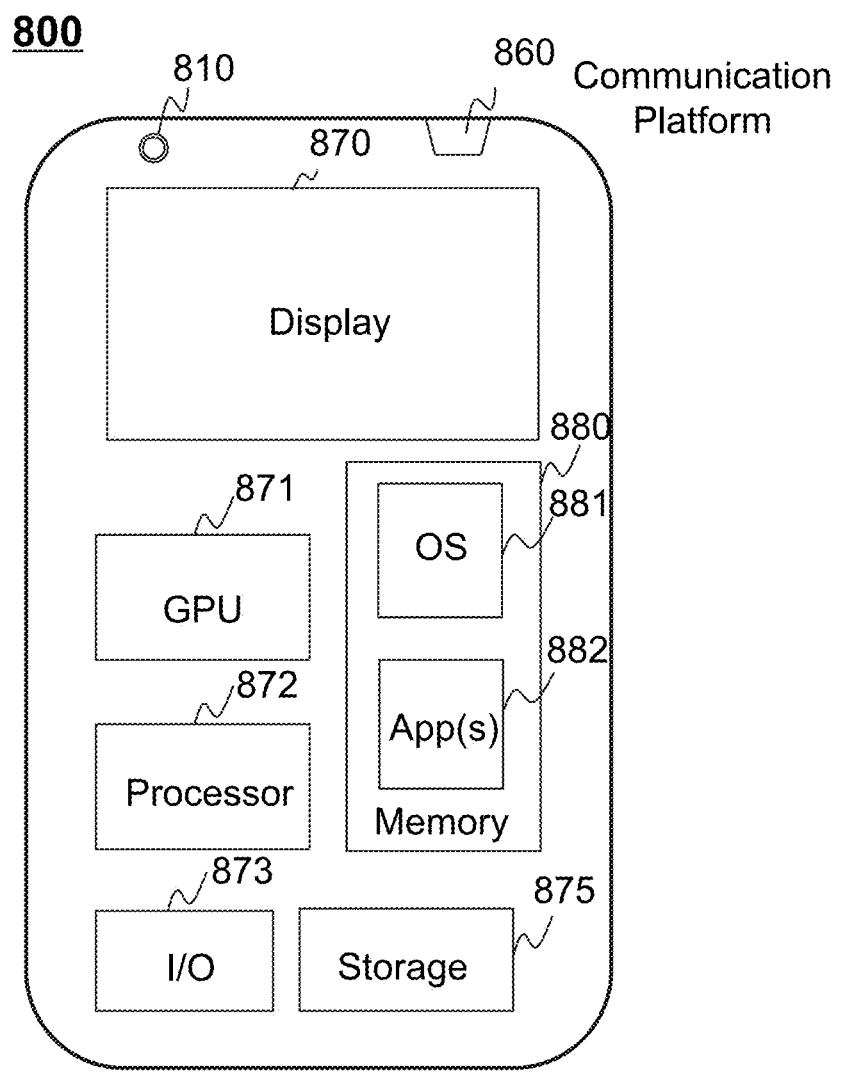
FIG. 8 is a schematic diagram illustrating an exemplary mobile computing device.

Software modules/units/blocks configured for execution on computing devices (e.g., processor 710 as illustrated in FIG. 7 and processor 872 as illustrated in FIG. 8) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

FIG. 1 is a schematic diagram illustrating an exemplary process for face alignment according to some embodiments of the present disclosure. Process 100 may be performed by a server and/or a mobile computing device to perform a face alignment on an image including a face. In some embodiments, one or more operations of process 100 illustrated in FIG. 1 may be implemented in the face alignment device 610 illustrated in FIG. 1. For example, process 100 may be stored in a storage device (e.g., storage device 640, 720, or 875) in the form of instructions, and invoked and/or executed by the face alignment device 610 (e.g., the processor 710 of the computing device 700 as illustrated in FIG. 7, the processor 872 of the mobile computing device 800 as illustrated in FIG. 8).

In 110, the at least one processor may construct a plurality of face alignment models (in other words, a face alignment model set including a plurality of candidate models) corresponding to different postural angle ranges.

Each of the plurality of face alignment model may determine a shape for a face (or an image of the face) included in an inputted image (e.g., test image), and may preferably be operated on a face having a postural angle within the corresponding postural angle range. The term "shape" in the present disclosure generally refers to a set of landmarks for describing key parts (e.g., eyes, nose, mouse, eyebrows) of a face. The postural angle range may be predetermined when training the corresponding face alignment model.

Then the at least one processor may conduct T stages of shape determination (or be referred to as T stages of model set updating operation or T updating stages) to a test image including a target face, wherein T is a positive integer. Operations 120 and 130 may be included in each stage of the T updating stages.

In 120, when conducting the T updating stages with respect to the test image including the target face, the at least one processor may determine confidence scores of shapes (first shapes) predicted (or determined) by the plurality of face alignment models at a current stage. T may be a positive integer. In some embodiments, T may be greater than 1.

The at least one processor may treat a confidence score of a first shape as an evaluation result of the corresponding face alignment model.

In 130, the at least one processor may exclude at least one face alignment model, whose confidence score is lower than a predetermined threshold, from the plurality of face alignment models, and then subject remainder models of the plurality of face alignment models to a next stage of the T updating stages.

In 140, the at least one processor may determine, based on at least one shape determined at the Tth stage of the T updating stages, a result shape of the target face, wherein the at least one shape is determined by the remainder models of the plurality of face alignment models at the T−1th stage.

In some other embodiments, the at least one shape for determining the result shape may be determined by at least one remainder model of the plurality of face alignment models at the Tth stage of the T updating stages.

Figure 2:
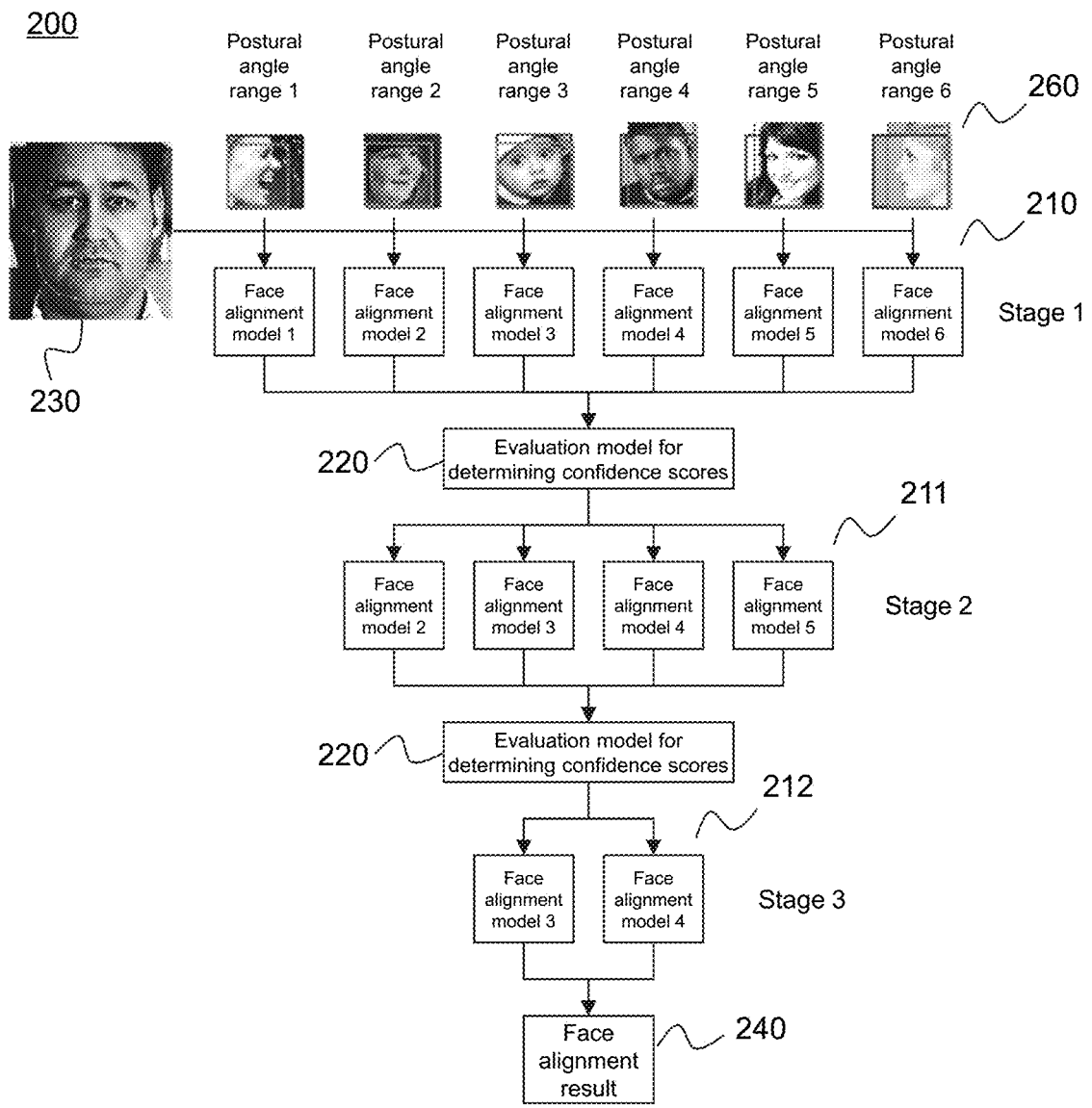
FIG. 2 is a schematic diagram of a model associated with the process for face alignment illustrated in FIG. 1 according to some embodiments of the present disclosure.

For demonstration purposes, detailed descriptions of process 100 may be provided in connection with FIG. 2.

FIG. 2 is a schematic diagram of a model associated with the process for face alignment illustrated in FIG. 1 according to some embodiments of the present disclosure. Model 200 may be referred to as a multi-view model, which may be operated by at least one processor (e.g., the processor 710 of the computing device 700 as illustrated in FIG. 7, the processor 872 of the mobile computing device 800 as illustrated in FIG. 8) to determine a result shape (e.g., the face alignment result 240) for a target face included in a test image (e.g., the test image 230). The model 200 may be in the form of instructions stored in a storage device (e.g., storage device 640, 720, or 875).

The model 200 may include a face alignment model set (e.g., the face alignment model set 210) and a model-evaluation model (e.g., the model-evaluation model 220). The face alignment model set may include M face alignment models (e.g., face alignment model 250). M may be an integer greater than 2. Each of the M candidate models may be trained for determining a shape of a face having a postural angle within a predetermined range in an image (e.g., postural angle ranges 1-6). The at least one processor may retrieve M face alignment models from a storage device (e.g., storage device 640, 720, or 875). In some embodiments, the at least one processor may be configured further to construct and train the M face alignment models (operation 110 illustrated in FIG. 1). Detailed descriptions of the training of M face alignment models are provided elsewhere in the present disclosure (e.g., in connection with FIGS. 3 and 4).

The model-evaluation model may be operated by the at least one processor to conduct a performance evaluation to a face alignment model, such as the face alignment models in the face alignment model set 210 or any other model capable of performing a face alignment. The at least one processor may retrieve the model-evaluation model from a storage device (e.g., storage device 640, 720, or 875). In some embodiments, the at least one processor may be configured further to construct and train the model-evaluation model. Detailed descriptions of the training of an exemplary model-evaluation model are provided elsewhere in the present disclosure (e.g., in connection with FIG. 3).

The model 200 may include N stages, wherein N is an integer equal to or greater than 2. The N stages may include T stages (e.g., stages 1 and 2) of shape determination (or T stages of model set updating operation or T updating stages) and one stage (e.g., stage 3) of result shape determination (N=T+1).

The model 200 may cause the at least one processor to conduct T stages of model set updating operation with respect to the test image. In each stage of the T updating stages, the at least one processor may conduct, via the model-evaluation model, a performance evaluation to each face alignment model (may also be referred to as a candidate model) of the face alignment model set, and then update the face alignment model set by excluding at least one model from the face alignment model set based on the performance evaluation. For example, the at least one processor may, for each candidate model of the face alignment models set, operate the candidate model to determine a corresponding shape (e.g., a corresponding first shape) associated with the target face included in the test image, determine a confidence score (operation 120 as illustrated in FIG. 1) of the determined shape as an evaluation result of the each candidate model, and then exclude the at least one model from the face alignment model set based on the confidence scores (operation 130 as illustrated in FIG. 1).

After the T stages of model set updating operation are completed, the at least one processor may designate at least one remainder model of the face alignment model set as at least one target model. And the at least one processor may determine (e.g., at stage 3), using the at least one target model and at least one shape determined at the Tth stage of the T updating stages, the result shape (the output shape of the model 200) of the target face (operation 140 illustrated in FIG. 1). For example, if there is only one target model left at the Tth stage, the at least one processor may input the shape determined at the Tth stage into the target model, and then obtain the result shape by running the target model.

Take the model 200 illustrated in FIG. 2 (N=3) as an example. The model 200 illustrated in FIG. 2 may have a face alignment model set initially including M=6 candidate models (e.g., the face alignment model set 210 including face alignment models 1 to 6). The face alignment models 1 to 6 may correspond to the postural angle ranges 1 to 6, respectively. The postural angle ranges 1 to 6 may be set in need. For example, the postural angle ranges 1 to 6 may be a series of yaw angle ranges starting from the front face in the unit of degree: [−90, −60), [−60, −30), [−30, 0), [0, +30], (+30, +60], (+60, +90]. For yaw angel ranges, the positive sign may indicate turn to right and the negative sign may indicate turn to left, as shown in FIG. 2.

It may be understood that, the number of the face alignment models as well as the series of postural angle ranges may be set arbitrarily. Besides, the term "postural angle" referred to herein is not limited to a yaw angle. The postural angle may be associated with yaw angles (e.g., turn left and turn right), pitch angles (e.g., turn up and turn down), roll angles (e.g., turn clockwise and turn anti-clockwise), or a combination thereof. The postural angle ranges of the candidate models may also be partially overlapped or separated apart.

For example, the face alignment model set may include $A_1$ candidate models (Y-models) associated with different yaw angle ranges and $A_2$ candidate models (P-models) associated with different pitch angle ranges, wherein $A_1$ and $A_2$ are both positive integers, and $A_1+A_2 \leq M$. For example, $A_1$ may be 5, $A_2$ may be 3, and M may be 8; the Y-models may correspond to a series of yaw angle ranges starting from the front face in the unit of degree: [−90, −45], [−45, −15], [−15, +15], [+15, +45], [+45, +90], and the P-models may correspond to a series of pitch angle ranges starting from the front face in the unit of degree: [−30, −15], [−10, +10], [+30, +60]. For pitch angel ranges, the positive sign may indicate turn up and the negative sign may indicate turn down.

Alternatively or additionally, the face alignment model set may include $M_3$ candidate models associated with a combination of different pitch angel ranges, different yaw angle ranges, and different roll angle ranges, i.e., [P, Y, R]. For example, a face alignment model may correspond to a postural angle range within the yaw angle range Y=[−60, −30], the pitch angle range P=[+30, +60], and the roll angle range R=[+15, +25].

As shown in FIG. 2, a T=2 stages (stages 1 and 2) of model set updating operation may then be conducted, by the at least one processor, with respect to the test image 230. At the stage 1, the at least one processor may operate each of the face alignment models 1 to 6 to determine a corresponding shape for the test image 230. The at least one processor may then determine, via the model-evaluation model 220, a confidence score for each of the shapes determined in the stage 1 as an evaluation result of the corresponding candidate model in the face alignment model set 210. Based on the evaluation result, the at least one processor may update the face alignment model set 210 by excluding, for example, face alignment models 1 and 6 from the face alignment model set 210, and the remainder models (the face alignment models 2 to 5) may form a face alignment model set 211 as the updated face alignment model set 210. The at least one processor may subject the face alignment model set 211 to the next stage of the T updating stages, i.e., the stage 2.

At the stage 2, similarly, the at least one processor may operate each candidate model of the face alignment model set 211 determined in the stage 1 (i.e., the face alignment models 2 to 5) to determine a corresponding shape for the test image 230. The at least one processor may then determine, via the model-evaluation model 220, a confidence score for each of the shapes determined in the stage 2 as an evaluation result of the corresponding candidate model in the face alignment model set 211. Based on the evaluation result, the at least one processor may update the face alignment model set 211 by excluding, for example, face alignment models 2 and 5 from the face alignment model set 211, and the remainder models (the face alignment models 3 and 4) may form an face alignment model set 212 (the updated face alignment model set of the Tth stage of the T updating stages).

As the T=2 updating stages are completed, the at least one processor may designate at least one candidate model of the face alignment model set 211 as a target model, and determine the face alignment result 240 (the result shape) via the target model in the result shape determination stage (stage 3). For example, when only one candidate model is left in the face alignment model set 212, the at least one processor may designate the only one candidate model as the target model and operate the target model (by inputting a shape determined by the target model at the T=2 stage into the target model) with respect to the test image to determine the result shape. When multiple candidate models are included in the face alignment model set 211, the at least one processor may designate the multiple candidate models as a plurality of target models, and then determine, for each target model of the plurality of target models, a preliminary shape by operating the each model. The at least one processor may determine the result shape based on the obtained preliminary shapes.

In some embodiments, each candidate model of the M candidate models itself (if not included in the model 200) may determine a shape of a face by iteratively modifying a first shape associated with the candidate model. An ith ($1 \leq i \leq M$) candidate model (e.g., any of face alignment models 1 to 6) of the M candidate models may include $K_i$ levels, corresponding to $K_i$ iterations. $K_i$ may be an integer equal to or greater than N. $K_i$ may correspond to the ith candidate model. Two of the M candidate models may have a same number of levels or different numbers of levels. The first T levels of the $K_i$ levels may respectively correspond to the T updating stages. For example, when T is greater than 1 (e.g., if T=3, then $K_i \geq 4$), the first level of the $K_i$ levels may correspond to the first stage of the T updating stages, the second level of the $K_i$ levels may correspond to the second stage of the T updating stages, and so on.

The first level of the $K_i$ level may be configured to modify the associated first shape towards the result shape of the target face, and the modified first shape may be treated as a first shape of the current level (or current iteration). Each subsequent level of the $K_i$ levels is configured to modify the first shape of a previous level (or previous iteration) towards the result shape of the target face (the result shape is regarded as a "ground truth" of the target face). The original version of the first shape may also be referred to as an initial shape. The initial shape of the ith candidate model may be associated with the training of the ith candidate model. For example, the initial shape of the ith candidate model may be based on ground truth shapes of training images included in a training image set 260 of the ith candidate model. Each of the training images of the training image set 260 may include a face having a postural angle within the postural angle range corresponding to the ith candidate model.

Each level of the ith candidate model may be or may include a regression model. The regression model may associate with a regression function and a set of parameters (e.g., a mapping matrix). In each stage of the T updating stages, based on the first shape of the previous level (or the initial shape when the current level is 1) and the test image, the at least one processor may operate a regression model of a corresponding level of the ith candidate model to modify the first shape of the previous level (or the initial shape when the current level is 1), and treat the modified first shape as the first shape of the current level. Detailed description of the regression function, the set of parameters, the operating of the ith candidate model, and the training of the ith candidate model, may be found elsewhere in the present disclosure (e.g., in connection with FIG. 3).

When the ith candidate model is included in the model 200, in a first stage of the T updating stages, the at least one processor may operate the ith candidate model (or a first level thereof) to perform a first iteration of the $K_i$ iterations with respect to the test image. The at least one processor may determine a first shape of the first level (or the first stage) based on the test image by modifying the corresponding initial shape via the ith candidate model.

The at least one processor may then determine, via the model-evaluation model 220, a confidence score for the first shape of the first stage as an evaluation result of the ith candidate model. For example, the at least one processor may determine a difference between the first shape of the first stage and the initial shape, and determine the confidence score of the first shape of the first stage based on the difference. The difference between the first shape of the first stage and the initial shape may be a good measure of the difference between the actual postural angle (which is unknown) of the target face included in the test image and the postural angle range associated with the ith candidate model. The at least one processor may determine, for example, a lower confidence score in response to a higher determined difference. The difference may take various forms. For example, the difference may be in the form of a distance (e.g., a Euclidean distance, a between-class distance, a distance with respect to centroids) between the first shape of the first stage and the initial shape. The confidence score may be determined based at least on such a distance. For example, the difference may be in the form of a ratio of the distance determined for the ith candidate model to the sum of distances determined for all the candidate models. Besides the first stage, in another stage (or any other stage) of the T updating stages, the at least one processor may also determine the confidence score of a candidate model of the face alignment model set subjected to that stage in a same or similar manner. An exemplary approach for determining a between-class distance between a first shape of the first stage and the initial shape as the difference for determining the confidence score is described in connection with FIG. 5.

The at least one processor may determine a confidence score for each candidate model of the face alignment model set in the first stage accordingly. Based on the determined confidence scores, the at least one processor may exclude (or remove) $a_1$ ($a_1 \geq 1$) candidate model(s) from the face alignment model set (e.g., candidate models 1 and 6), wherein $a_1$ is an integer. The at least one processor may identify at least one candidate model from the face alignment model set that has the confidence score matching a predefined rule associated with the first stage. In some embodiments, the at least one processor may identify one or more candidate models having the confidence score lower than a predetermined threshold associated with the first stage as the $a_1$ candidate model(s) to be excluded, wherein $a_1$ is not predetermined. According to some other embodiments of the present disclosure, the at least one processor may rank the candidate models of the face alignment model set based on the confidence score, and exclude $a_1$ candidate models with lowest confidence scores, wherein $a_1$ is a predetermined number associated with the first stage. The at least one processor may subject remainder models of the face alignment model set to a next stage of the T updating stages.

Similarly, in a tth ($2 \leq t \leq T$) stage of the T updating stages, for the $i_t$th ($1 \leq i_t \leq M_t$, $M_t$ is the number of candidate models in the face alignment model set subjected to the tth stage) candidate model of the face alignment model set, the at least one processor may operate the $i_t$th candidate model (or a tth level thereof) to perform a tth iteration of the $K_t$ iterations with respect to the test image. The at least one processor may determine, for the $i_t$th candidate model, a first shape of the tth level (or the tth stage) based on the test image by modifying a shape (or input shape) inputted into the $i_t$th candidate model in the tth stage.

In some embodiments, the input shape may be the first shape determined by the $i_t$th candidate model in the previous stage (t−1th stage).

In some embodiments, the at least one processor may determine an input shape for all the candidate models subjected to the tth stage. For example, the at least one processor may determine a second shape in the t−1th stage as the input shape of the tth stage. The second shape may be a weighted sum (if the sum of the weights is 1) or a weighted mean of the first shapes determined in the t−1th stage by all the candidate models subjected to the t−1th stage. As another example, the second shape may be a weighted sum or a weighted mean of the first shapes determined in the t−1th stage by the candidate models to be subjected to the tth stage. A weight associated with a first shape determined in the t−1th stage may be or be based on the confidence score of the first shape.

The at least one processor may then determine a confidence score for each candidate model of the face alignment model set in the tth stage in a manner as described in connection with the first stage. Based on the determined confidence scores, the at least one processor may exclude (or remove) $a_t$ ($a_t \geq 1$) candidate model(s) from the face alignment model set, wherein $a_t$ is an integer associated with the tth stage. The at least one processor may identify at least one candidate model from the face alignment model set that has the confidence score matching a predefined rule associated with the tth stage.

In some embodiments, all the T updating stages may adopt a same predetermined rule. For example, in each stage of the T updating stages, the at least one processor may rank the candidate models of the face alignment model set based on the confidence score of the stage, and exclude a same number (e.g., 1, 2, 3) of candidate model(s) with lowest confidence scores. As another example, in each stage of the T updating stages, the at least one processor may identify the candidate model(s) to be excluded from the face alignment model set by comparing the corresponding confidence score with a same threshold (e.g., the confidence score takes the form of the ratio described above).

In some embodiments, however, the T updating stages may adopt different rules at different stages. For example, the at least one stage (or the each stage) may associate with a different threshold for determining the candidate model(s) to be excluded compared with that of another stage of the T updating stages. As another example, the rules of excluding candidate models from the face alignment model set at some stages may be based on rankings of the models in the alignment model set. The number of the candidate model(s) to be excluded from the face alignment model set based on the ranking in the at least one stage (or the each stage) may be different from that of another stage of the T updating stages.

In some embodiments, a stage of the T updating stages may correspond to multiple levels of the candidate models. For example, during such a stage, the at least one processor may operate Q (Q≥2) levels of each of the candidate models sequentially to determine a first shape corresponding to that stage (e.g., in a process similar to the one that the candidate model operates when it is not included in the model 200). The first shape may be modified for Q times in such a stage.

After the T updating stages are completed, the at least one processor may designate at least one remainder model of the face alignment model set (updated at the Tth stage) as at least one target model, and determine, based on at least one shape determined at the Tth stage, the result shape via the at least one target model in the Nth stage (or the T+1th stage).

For example, when only one candidate model is included and/or left in the face alignment model set updated at the Tth stage, the at least one processor may designate the only one candidate model as the target model. The at least one processor may operate the rest level(s) (level(s) other than the first T levels) of the target model to determine the result shape of the target face. The input shape of the target model in the Nth stage may be the first shape determined by the target model in the Tth stage. Alternatively, the input shape of the target model may be a second shape determined in the Tth stage. The second shape may be a weighted sum (if the sum of the weights is 1) or a weighted mean of the first shapes determined in the Tth stage by all the candidate models subjected to the Tth stage (i.e., the remainder models of the face alignment model set at the T−1th stage as described in operation 140).

As another example, when multiple candidate models are included and/or left in the face alignment model set updated at the Tth stage, the at least one processor may designate the multiple candidate models as a plurality of target models, and then determine, for each target model of the plurality of target models, a preliminary shape by operating the target model. The determination of the preliminary shape may be the same as or similar to the determination of the result shape when only one candidate model is included in the face alignment model set updated at the Tth stage. The at least one processor may then determine the result shape based on the obtained preliminary shapes. For example, the result shape may be a mean, a weighted mean, or a weighted sum (if the sum of the weights is 1) of the preliminary shapes. The at least one processor may determine a weight of a preliminary shape based on the confidence score of the corresponding target model determined in the Tth stage (e.g., in a manner the same as or similar to the determination of weights when determining a second shape). Alternatively or additionally, the at least one processor may determine a weight of a preliminary shape based on confidence scores of the corresponding target model determined at multiple stages (or all the stages) of the T updating stages.

The number T may be a predetermined number such that with the predetermined rule of each stage, only a predetermined number of candidate model is left before or upon completion of the T stage. For example, when a face alignment model set initially including 5 face alignment models is to be updated, and in each stage of the T updating stages only one face alignment model is to be excluded from the alignment models set, T may be predetermined as 4 (or any other proper number).

The number T may also be variable according to an actual execution process of the model 200. For example, when a face alignment model set initially including 5 face alignment models is to be updated, and in each stage of the T updating stages, the face alignment model(s) to be excluded is (or are) determined based on a threshold associated with the each stage, the number T may depend on an actual execution process of the model 200 and may vary between 1 to 4. The at least one processor may keep operating the model 200 until a stop criterion is satisfied. For example, the at least one processor may keep operating the model 200 until only 1 (or any other proper number) face alignment model is left in the face alignment model set. Alternatively or additionally, the at least one processor may keep operating the model 200 until no candidate model can be excluded from the face alignment model set.

In some embodiments, to achieve the operation 110 illustrated in FIG. 1, the at least one processor may perform the below operations (a-i) and (a-ii) for constructing a plurality of face alignment models corresponding to different postural angle ranges (e.g., the face alignment model set 210 as illustrated in FIG. 2).

In operation (a-i), the at least one processor may obtain a plurality of training image sets corresponding to different postural angle ranges of a human face. For example, the at least one processor may obtain 6 training image sets corresponding to 6 postural angle ranges. The 6 postural angle ranges may be respectively featured in a series of yaw angles starting from the front face, including: −30, −60, −90, +30, +60, +90, wherein the positive sign may indicate turn right and the negative sign may indicate turn left. One of the plurality of training image sets may correspond to one candidate model of the face alignment model set.

In operation (a-ii), for each of the plurality of training image sets, the at least one processor may train a corresponding face alignment model (or candidate model) via a supervised descent method (SDM) based approach.

For example, a process for training each candidate model of the face alignment model set with a corresponding training image set may be the same as or similar to a typical SDM approach. An SDM approach for training each candidate model may include a plurality of stages arranged in cascade. Each stage may be for a regression model which determines a shape of a face included in an input image (e.g., the test image 230). Each level of each candidate model may correspond to such a regression model. In some embodiments, to achieve the operation (ii) for obtaining the face alignment model set, the at least one processor may train each candidate model of the face alignment model set with a corresponding training image set for a plurality of stages (e.g., N stages) in a process described in connection with FIG. 3.

For example, for an ith candidate model having $K_i$ ($K_i \geq N$) levels, the at least one processor may perform $K_i$ stages of training operation (or be referred to as $K_i$ training stages) as illustrated in FIG. 3 for training the ith candidate model. In each stage of the $K_i$ training stages, a regression model of a corresponding level of the ith candidate model may be trained with the training image set of the ith candidate model. After the $K_i$ training stages are completed, the ith candidate model may be ready to be included in the model 200.

It may be noted that the above descriptions of face alignment are only for demonstration purposes and not intended to be limiting. It is to be understood that, after learning the major concept and the mechanism of the present disclosure, a person of ordinary skill in the art may alter process 100 or the model 200 in an uncreative manner. For example, one or more optional operations may be added to process 100, and one or more optional models may be added into the model 200. One or more operations or models of the model 200 may be split or be combined. All such modifications are within the protection range of the present disclosure.

FIG. 3 is a schematic diagram illustrating an exemplary process for training a face alignment model according to some embodiments of the present disclosure. Process 300 may be performed to train a face alignment model corresponding to a postural angle range. The face alignment model may be a candidate model included in the face alignment model set to be updated in process 100, such as an ith candidate model having $K_i$ ($K_i \geq N$) levels. In some embodiments, one or more operations of process 300 illustrated in FIG. 3 may be implemented in the face alignment device 610 illustrated in FIG. 6. For example, the process 300 illustrated in FIG. 3 may be stored in a storage device (e.g., storage device 640, 720, or 875) in the form of instructions, and invoked and/or executed by the face alignment device 610 (e.g. the processor 710 of the computing device 700 as illustrated in FIG. 7, the processor 872 of the mobile computing device 800 as illustrated in FIG. 8).

In 310, the at least one processor may assign an initial shape (i.e., a first shape haven't been modified) to the face alignment model corresponding to the postural angle range (the ith candidate model). The initial shape may include a plurality of landmarks. The initial shape may be a predetermined shape and/or an arbitrary shape, which may be modified via the trained ith candidate model with respect to a face image (e.g., the test image 230), so that the landmarks of the modified shape (the first shape determined via the $K_i$th level) may be moved toward its supposed location on the face image precisely.

Each training image included in the training image set of the ith candidate model may associate with a ground truth shape, which may be a shape accurately reflect key parts of the face included in the training image. In some embodiments, the initial shape associated with the ith candidate model may be based on ground truth shapes of the training image set of the ith candidate model. For example, the initial shape may be a mean of the ground truth shapes. Alternatively, the initial shape may be a shape designated manually. In some embodiments, the manually designated shape may correspond to a postural angle within the postural angle range associated with the ith candidate model.

Two of the initial shapes associated with the candidate models of the face alignment model set may be the same or different. For example, the two of the initial shapes may have the same or different numbers of landmarks. For demonstration purposes and not intended to be limiting, a first initial shape corresponding to the yaw angle range [−90, −60] may include fewer landmarks than a second initial shape corresponding to the yaw angle range [−30, +30] due to a missing of an eye and some other parts of the face. It may be understood that, the first initial shape and the second initial shape may still have the same numbers of landmarks, and the redundant landmarks (e.g., the ones representing the missing eye) may be aligned to, for example, null, one or more meaning less pixels of an input face image, or the counterpart(s) of the missing part(s) (e.g., the other eye).

In 320, the at least one processor may obtain a shape feature vector for the initial shape with respect to a training image of the training image set. The shape feature vector may include, for example, histogram of oriented gradients (HOG) features associated with all the landmarks of the initial shape.

For example, the at least one processor may generate a landmark feature vector (first feature vector) by extracting a feature (e.g., HOG, scale-invariant feature transform (SIFT), speeded up robust features (SURF), local binary pattern (LBP), or any other proper feature) or features of a same type from a patch associated with each of the landmarks included in the initial shape, and then generate the shape feature vector (second feature vector) based on the obtained landmark feature vectors. The patch may be a local image region of the training image including a pixel corresponding to the each landmark. For example, the patch may have a center at the pixel corresponding to the each landmark.

In some embodiments, the at least one processor may generate the shape feature vector of the initial shape by concatenating the landmark feature vectors of the landmarks thereof.

The above process may be performed by the at least one processor via an index feature extraction function $\phi$. The at least one processor may operate $\phi$ based on an input shape (e.g., the initial shape, any other version of the first shape, the second shape) and an input image (e.g., a training image, a test image) to determine a shape feature vector of the input shape with respect to the input image. The index feature extraction function $\phi$ may have a mathematic form $\phi=\{F_1, F_2, \ldots, F_n\}$, wherein n is the number of landmarks included in the input shape, and function $F_1, F_2, \ldots, F_n$ may each be a feature extraction function (e.g., HOG feature extraction function, SIFT feature extraction function, SURF feature extraction function) associated with the corresponding landmark. Take the function $F_1$ as an example, $F_1$ may determine a patch on the input image based on the coordinates of a corresponding landmark, and then generate a landmark feature vector of the corresponding landmark by extracting a feature or features of a same type from the determined patch. The index feature extraction function $\phi$ may than concatenate the landmark feature vectors generated by the feature extraction functions $F_1, F_2, \ldots, F_n$ to generate a shape feature vector of the input shape.

In some embodiments, $F_1, F_2, \ldots, F_n$ may determine same shaped/sized patches and extract features of a same type (e.g., HOG, SIFT). Alternatively, $F_1, F_2, \ldots, F_n$ may determine different shaped/sized patches and/or extract features of a same type or different types. In some embodiments, the feature extraction functions $F_1, F_2, \ldots, F_n$ may each determine a patch associated with a corresponding landmark and/or extract features from the associated patch according to a feature index. The feature index may include an association between each landmark of an associated shape and one or more parameters related to a patch and/or features to be extracted corresponding to the each landmark. Detailed descriptions of such a feature index may be found elsewhere in the present disclosure (e.g., in connection with FIG. 4).

The at least one processor may then conduct $K_i$ stages of training operation (or $K_i$ training stages) to the ith candidate model. In each stage of the $K_i$ training stages, a regression model of a corresponding level of the ith candidate model may be trained with the training image set of the ith candidate model. Operations 330 and 340 may be included in the each stage.

In 330, in a tth ($1 \leq t \leq K_1$) stage of the $K_i$ training stages, the at least one processor may determine a mapping matrix $W_t$ by solving a linear regression function $$\Delta S_t = W_t \phi_t(I, S_{t-1}),  \quad \text{Equation 1}$$

associated with a regression model of the tth level of the ith candidate model (or be referred to as a level t model) with respect to the training images of the training image set, wherein $\phi_t$ is an index feature function associated with the tth stage for determining a shape feature vector of an input shape (e.g., $S_{t-1}$) with respect to an input image (e.g., I), I is a matrix of the input image (during the training, I may be a matrix of a training image; during the usage, I may be a matrix of a test image), $S_{t-1}$ is a shape (first shape) of the t−1th level determined via a trained level t−1 model of the ith candidate model with respect to I, $\Delta S_t$ is a difference between the shape $S_{t-1}$ of the t−1th level and a shape $S_t$ of the tth level to be outputted by the level t model.

For training the level t model, the ground truth shape $S_{GT}$ of a training image I may be used as the $S_t$. The determined mapping matrix $W_t$ may be referred to as a learned $W_t$.

In 340, the at least one processor may update (or modify) the initial shape (or first shape) sequentially by $$S_t = S_{t-1} + \Delta S_t, \quad \text{Equation 2}$$

for determining a shape $S_t$ of the tth level. $\Delta S_t$ may be determined by applying Equation 1 on $S_{t-1}$ with the learned $W_t$. The determined $\Delta S_t$ may be referred to as a shape increment. The determination of $S_t$ may be performed for determining $W_{t+1}$ according to Equation 1. The at least one processor may keep performing the training stage by stage, until a predetermined termination condition is satisfied. In some embodiments, the termination condition may associate with a count of iterations or stages (for example, a stage=3 indicates 3 iterations). Alternatively, the termination condition may associate with a maximum allowable difference (e.g., in the form of an aforementioned distance) between a ground truth shape of a training image and a shape predicted (or determined) at the current training stage.

For example, for training the ith candidate mode, in the $t=1^{st}$ stage of the $K_i$ training stages, the at least one processor may train a level 1 model of the ith candidate model with the training image set. The initial shape $S_0$ assigned to the ith candidate model may be used as $S_{t-1}$, and a difference between $S_0$ and a ground truth shape $S_{GT}$ of a training image I may be used as the $\Delta S_t$. By solving Equation 1 with respect to all the training images of the training image set, the at least one processor may obtain a learned $W_1$ as a training result of the level 1 model.

Then in the $t=2^{nd}$ stage of the $K_i$ training stages, the at least one processor may train a level 2 model of the ith candidate model with the training image set. For a training image I of the training image set, according to Equation 1, the at least one processor may determine a shape increment $\Delta S_1$ based on the learned $W_1$, the initial shape $S_0$, and I. The at least one processor may modify $S_0$ with the determined $\Delta S_1$ according to Equation 2 to generate a shape $S_1$ with respect to the training image I. The at least one processor may obtain a learned $W_2$ by solving Equation 1 with $S_1$, I, and a difference between $S_1$ and the ground truth shape $S_{GT}$ of the training image I.

Accordingly, the at least one processor may train the ith candidate model level by level. In a tth stage of the $K_i$ training stages, according to Equation (1) and Equation (3), the at least one processor may modify $S_{t-2}$ to determine $S_{t-1}$, and obtain a learned $W_t$ as a training result of the level t model by solving Equation (1) associated with the level t model.

In some embodiments, $K_i$ may be a predetermined number associated with the ith candidate model. For example, the termination condition of the training may be that the count of training stages is equal to or larger than $K_i$. By controlling the number of training stages, the number of levels of the ith candidate model may be controlled consequently.

In some embodiments, $K_i$ may be dependent on the training result of the ith candidate model. For example, the termination condition of the training may be that a difference (e.g., in the form of an aforementioned distance) between a ground truth shape of a training image and a shape determined by the current level of the ith candidate model based on the training image is less than a predetermined threshold. Consequently, the number of levels of the ith candidate model cannot be predetermined.

In some embodiments, Equation 1 may take a linear mathematic form $$S_t = S_{t-1} + R_t \phi_t(I, S_{t-1}) + b_t, \qquad \text{Equation 3}$$

wherein the mapping matrix $W_t$ in Equation 1 is divided into two matrixes $R_t$ and $b_t$. The at least one processor may determine $R_t$ and $b_t$ as a training result of the level t model by solving Equation 3 with respect to the training images of the training image set using, for example, a least square based approach. The determined $R_t$ and $b_t$ may also be referred to as learned $R_t$ and $b_t$. The learned $R_t$ and $b_t$ may be used to determine a shape $S_t$ outputted by the level t model instead of the learned $W_t$.

After the $K_i$ training stages are completed, the trained ith candidate model may iteratively modify the initial shape (or first shape) to determine a shape of a target face included in a test image (e.g., test image 230). The determination may include $K_i$ iterations corresponding to $K_i$ training stages. Then the trained ith candidate model may be used to construct the model 200 as illustrated in FIG. 2.

When a trained candidate model is included in the model 200, and the model 200 is operated by the at least one processor to determine a result shape of target face included in a test image, in a tth stage of the T updating stages, the at least one processor may determine, via the function $\phi_t$, a shape feature vector for a second shape (or a first shape of the t−1th level determined by the same candidate model if the generation of the second shape is not included in the model 200) determined in the t−1th stage. For example, the at least one processor may generate, for each landmark (first landmark) of the second shape (or the first shape), a landmark feature vector by extracting features from a patch associated with the each landmark. The at least one processor may determine the patch on the test image based on the coordinates of the each landmark. The at least one processor may then determine the shape feature vector by concatenating the obtained landmark feature vectors.

The at least one processor may then determine, based on the obtained shape feature vector, a shape increment via a regression function (e.g., Equation 1) associated with a level t model of the candidate model. The at least one processor may assign the second shape (or the first shape) determined in the t−1th stage to $S_{t-1}$. The at least one processor may modify the second shape (or the first shape) based on the shape increment via Equation 2 to generate a first shape of the tth level. The at least one processor may then determine a confidence score (e.g., via the model-evaluation model 220) for the first shape of the tth level as an evaluation result of the candidate model.

In some embodiments, the features extracted from patches corresponding to the landmarks in the aforementioned SDM based training and the operating of the model 200 may be scale-invariant feature transform (SIFT) features or HOG features. In some embodiments, for enhancing the robust of the model 200, and reducing its cost, in operation 320 as well as any other index feature extraction function $\phi_t$ related operations, the extracted features may be multi-scaled HOG features described in connection with FIG. 4.

Figure 4:
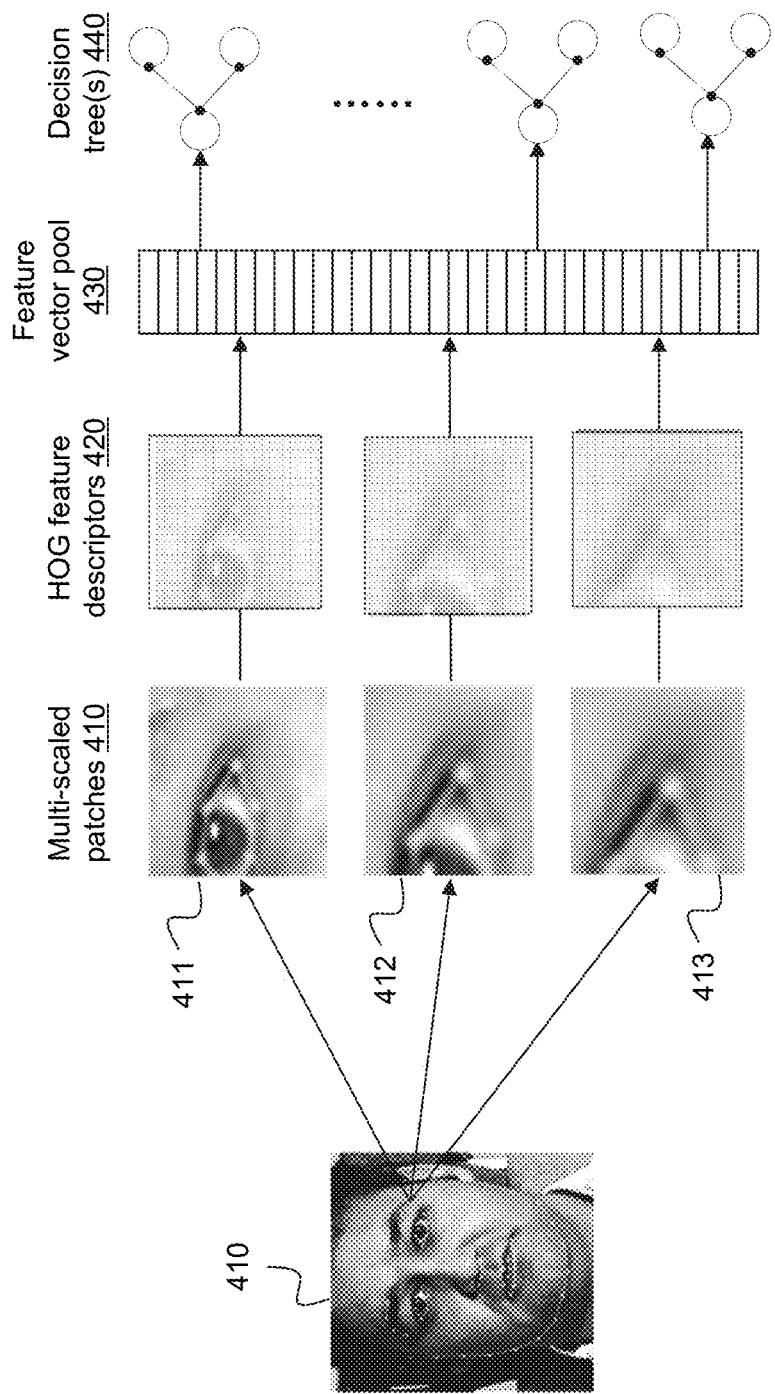
FIG. 4 is a schematic diagram illustrating an extraction of multi-scale HOG features according to some embodiments of the present disclosure.

FIG. 4 is a schematic diagram illustrating an extraction of multi-scale HOG features according to some embodiments of the present disclosure. In some embodiments, the extraction of multi-scaled HOG features may be performed by at least one processor (e.g., the processor 710 of the computing device 700 as illustrated in FIG. 7, the processor 872 of the mobile computing device 800 as illustrated in FIG. 8) to generate a landmark feature vector of a landmark.

To perform the extraction of the multi-scale HOG features, The at least one processor may first generate a feature index via operations described as following:

In operation (b-i), according to a predetermined sequence (e.g., according to a sequence that landmarks arranged in a shape), the at least one processor may select a landmark (first landmark) from a first shape (or an initial shape), and determine a plurality of candidate patches (or be referred to as multi-scaled patches, e.g., multi-scaled patches 410) with different radii for the landmark. The landmark may be a point or an element of the ground truth shape.

To determine the multi-scaled patches, the at least one processor may determine a landmark (second landmark) in a ground truth shape of a training image. The determined second landmark may correspond to the first landmark of the first shape. For example, the second landmark and the first landmark may have a same index number or serial number. The at least one processor may then determine the multi-scaled patches around the determined second landmark on the training image.

The multi-scaled patches may be square, circular, or of any other proper shape. The radii may refer to a half side length for a square patch. It may be noted that, other parameters associated with the shape and/or size of a patch (patch parameters) may also be used for determining the plurality of candidate patches.

In operation (b-ii), the at least one processor may extract HOG features from the multi-scaled patches, and generate a plurality of HOG feature descriptors (e.g., HOG feature descriptors 420) for the multi-scaled patches. For example, as illustrated in FIG. 4, the at least one processor may determine patches with radii r (e.g., patch 411), r/2 (e.g., patch 412), and r/4 (e.g., patch 413), as the multi-scaled patches.

In operation (b-iii), the at least one processor may determine HOG feature vectors based on the HOG feature descriptors as candidate feature vectors and input the candidate feature vectors into at least one decision tree for conducting a feature selection. The at least one decision tree may have a depth of 1.

In operation (b-iv), the at least one processor may select, via the at least one decision tree, an HOG feature corresponding to a radius (or any other patch parameter) causing a minimum variance of the generated feature vectors with respect to a training image set as the multi-scaled HOG feature of the landmark.

The at least one processor may generate an association between the radius of the corresponding patch and the landmark. The association may be included in the feature index.

In some embodiments, to generate an HOG feature descriptor for a patch, for each pixel of the patch, the at least one processor may perform following operations.

In operation (c-i), the at least one processor may determine a gradient value for the pixel by:

$$grad(x, y) = \sqrt[2]{D_x + D_y},$$ Equation 4

$$D_x = f(x+1, y) - f(x, y),$$ Equation 5

$$D_y = f(x, y+1) - f(x, y),$$ Equation 6 wherein, x and y are coordinates of the each pixel, $f$ is a function for preprocessing the patch (e.g., gamma/color normalization), grad (x,y) is the gradient value to be determined for the each pixel.

In some embodiments, equations 5 and 6 may be replaced by equations 7 and 8, which may be expressed as:

$$d_x = f(x+1, y) - f(x-1, y),$$ Equation 7

$$d_y = f(x, y+1) - f(x, y-1),$$ Equation 8

In operation (c-ii), the at least one processor may determine a gradient direction for the pixel by:

$$\theta = \arctan\left(\frac{D_y}{D_x}\right),$$ Equation 9.

Via equation 4 and equation 9, the at least one processor may generate two HOG descriptors for the corresponding patch, representing gradient values and gradient directions of the corresponding pixels in the patch. The at least one processor may then generate a HOG feature vector based on the two HOG descriptors. The generation of the HOG feature vector based on the two HOG descriptors (e.g., the determination of histogram of gradients via spatial/orientation binning) is well known in the art and is not repeated herein.

For example, to generate a feature index corresponding to a first shape $S_i$ associated an ith (1≤i≤M) candidate model of the face alignment model set in the model 200, for a landmark p (first landmark) of the first shape $S_i$, the at least one processor may retrieve a training image set including a plurality of training images. For example, the training image set may be the one for training the ith candidate model. The at least one processor may also obtain a set of candidate patch parameters associated with a shape or size of a patch. For example, the set of candidate patch parameters may include at least one of a radius, a inradius, a circumradius, a diameter, a shape, a size, a side length, a half side length, a length of a diagonal, a coordinate range, or the like, or a combination thereof.

Then the at least one processor may conduct an evaluation of the set of candidate patch parameters for the landmark p (first landmark) with respect to the training images using a feature-evaluation model (e.g., the at least on decision tree). The feature-evaluation model may evaluate the candidate patch parameters based on an invariance of a corresponding feature vector, and select a target candidate patch parameter corresponding to a feature vector showing the best invariance. That is, based on the target candidate patch parameter, hopefully, a feature vector A associated with the landmark p determined in an image A and a feature vector B associated with the landmark p determined in an image B are very identical, as long as the second landmarks corresponding to the landmark p locates right at its supposed location in both of the image A and the image B (e.g., a landmark corresponding to a canthus locates right at a canthus of a face included in the image).

The at least one processor may select, based on the evaluation result, the target patch parameter from the set of candidate patch parameters for the landmark p. The at least one processor may then generate an association to be included in the feature index between the target patch parameter and the landmark p. The feature index may be in the form of a look-up table, a function, or the like, or a combination thereof. Accordingly, the association may be an item of a look-up table, a sub-function, or the like, or a combination thereof.

In some embodiments, the feature-evaluation model may be or include at least one decision tree with a depth as 1. The splitting strategy of the node(s) of the at least one decision tree may adopt a maximum variance reduction approach. For example, the regression function for training the at least one decision tree may be:

$$\varphi = \max_F(var_{root}(p, F) - varl(p, F_T) - varr(p, F_R))$$ Equation 10 wherein F is a feature vector pool (e.g., the feature vector pool 430) including feature vectors generated based on all the candidate patch parameters and all the training images of the training image set with respect to p, p is the landmark, $F_T$ is a group of feature vectors of F classified into the left child node of the at least one decision tree, $F_R$ is another group of feature vectors of F classified into the right child node of the at least one decision tree, varl(p,$F_T$) is a variance of the $F_T$, varl(p,$F_R$) is a variance of the $F_R$, and var$_{root}$(p,F) is a variance of F. For determining a variance of feature vectors, the at least one processor may determine a Euclidean distance between a feature vector and the mean vector of the corresponding group of feature vectors as a measure of their difference. The training of the at least one decision tree is to maximize φ.

For example, the evaluation of the set of candidate patch parameters for the landmark p may be performed in the form of a training of the at least one decision tree. During the training of the at least one decision tree, for each of the set of candidate patch parameters, and for each of the ground truth shapes (or be referred to as standard shapes) of the training images, the at least one processor may determine, based on the each candidate patch parameter, a candidate patch on the corresponding training image, and then generate a candidate feature vector by extracting HOG features from the determined candidate patch. The at least one processor may determine the candidate patch based on a landmark (second landmark) in the ground truth shape of the corresponding training image corresponding to the landmark p (first landmark) The generated candidate feature vectors may form the feature vector pool F.

According to Equation 10, the at least one processor may determine a variance of the generated candidate feature vectors associated with the each of the set of candidate patch parameters, and split the root node of the at least one decision tree by selecting a candidate patch parameter from the set of candidate patch parameters that causes a maximum variance reduction. For example, with a greedy approach, the at least one processor may try to classify candidate feature vectors associate with one candidate patch parameter into the left child node of the at least one decision tree, while classify candidate feature vectors associate with other candidate patch parameters into the right child node of the at least one decision tree. Via Equation 10, the at least one decision tree may determine a $\varphi$ for each trial, and select a candidate patch parameter corresponding to a maximum $\varphi$ as the target patch parameter.

In some embodiments, the feature-evaluation model may include a plurality of decision trees (e.g., a random forests model). Each of the decision trees may be trained similarly with the above approach. The training set for each of the decision trees may be generated using a bootstrap aggregating approach based on the whole training image set. The target patch parameter may be the candidate patch parameter selected by the most of trees. For example, when the feature-evaluation model includes 10 decision trees, while 2 of them select a radius of r, 3 of them select a radius of r/2, and 5 of them select a radius of r/4, the target patch parameter may be the radius r/4.

For each landmark of the first shape, the at least one processor may perform the above process to generate an association to be included in the feature index between a selected target patch parameter and the each landmark. First shapes of different candidate models may associate different feature indexes.

After the feature indexes are generated, during the operating or training of the ith candidate model, when the at least one processor is to generate a shape feature vector of an associated first shape (e.g., $S_0$, $S_t$, $S_{t-1}$), the at least one processor may obtain a feature index associated with first shape. And for each landmark (first landmark) of the first shape, the at least one processor may determine, based on the associated feature index, a patch on the test image associated with the each landmark, and then generate a landmark feature vector by extracting HOG features from the patch. The at least one processor may concatenate the generated landmark features to form the shape feature vector.

In some embodiments, the feature index of the ith candidate model may serve as one of the inputs of the index feature extraction function $\phi$, or be used to determine the input of the index feature extraction function. For example, the feature index may have a form $\{r_1, r_2, \ldots, r_n\}$, wherein n is the number of the landmarks of the first shape, $r_1, r_2, \ldots, r_n$ are patch parameters associated with the $1^{st}$, $2^{nd}$, . . . , nth landmark of the first shape. Based on $r_1$, $r_2, \ldots, r_n$, feature extraction functions $F_1, F_2, \ldots, F_n$, of $\phi$ may each determine a patch and extract HOG features therefrom.

It may be noted that, the concept of the multi-scaled HOG feature may also be applied to other types of features. For example, the feature extraction functions $F_1, F_2, \ldots, F_n$ may extract LBP features, SURF features, local ternary pattern (LTP) features, etc., from the patches determined based on the feature index.

Alternatively or additionally, the feature index may include an association between a type of features to be extracted and each landmark of the corresponding first shape. Based on such a feature index, the at least one processor may determine a certain type of features associated with the each landmark, and then generate a landmark feature vector by extracting features of the certain type from the patch associated with the each landmark. For example, for a $1^{st}$, $2^{nd}$, . . . , nth landmark of the first shape, the corresponding feature type may be HOG, LBP, . . . , HOG. The at least one processor may concatenate the generated landmark features to form the shape feature vector.

To generate the feature index including the association between a type of features to be extracted and each landmark of the corresponding first shape, the at least one processor may use a feature-evaluation model in a similar manner. For example, the evaluation model may include at least one tree for selecting a target feature type from a set of candidate feature types using the maximum variance reduction approach.

In some embodiments, a feature index may include multiple types of associations for associating multiple types of parameters with a landmark. For example, via such a feature index, a landmark may be associated with a size of patch, a shape of patch, a feature type, etc. For generating such a feature index, the feature-evaluation model may include at least one tree for selecting a parameter (target parameter) of each type for a corresponding landmark. Alternatively or additionally, the depth of the at least one tree may be more than 1. For example, a tree in feature-evaluation model may have a depth less than or equal to the number of the multiple types of parameters, and a parameter of one type may be selected at each depth.

It is understood that, the feature-evaluation model is not limited to a decision tree based model or a random forests based model as described above. Other types of classify models (e.g., supported vector machine (SVM), artificial neural network) and/or feature selection algorithms (e.g., filter, wrapper, embedding) may also be used according to a same or similar principle. The metric for evaluating the candidate patch parameters or other types of parameters (e.g., feature type) is also not limited to the aforementioned variance of the generated feature vectors. Other types of parameter related to the invariance or consistency of the generated feature vectors may also be used as a metric, such as a sum of the distances from the generated feature vectors to the mean vector of the corresponding group of feature vectors.

In some embodiments, to achieve operation 120 illustrated in FIG. 1, for determining confidence scores of shapes (first shapes) determined by the plurality of face alignment models of a current stage, the at least one processor may perform a process illustrated in FIG. 5.

FIG. 5 is a schematic diagram illustrating an exemplary process for determining a confidence score for a face alignment model according to some embodiments of the present disclosure. In some embodiments, one or more operations of process 500 illustrated in FIG. 5 may be implemented in the face alignment device 610 illustrated in FIG. 1. For example, the process 500 illustrated in FIG. 5 may be stored in a storage device (e.g., storage device 640, 720, or 875) in the form of instructions, and invoked and/or executed by the face alignment device 610 (e.g., the processor 710 of the computing device 700 as illustrated in FIG. 7, the processor 872 of the mobile computing device 800 as illustrated in FIG. 8).

For each candidate model (e.g., for an ith candidate model) of the face alignment model set, the at least one processor may perform process 500 for training a projection vector (operations 510 to 530) associated with the each candidate model and determining, based on the projection vector, a confidence score for the candidate model (operation 540). The operations for obtaining of the projection vector may be performed before the operating of the model 200. The determination of confidence score based on the projection vector may be performed at each stage of the T updating stages via the aforementioned model-evaluation model. The confidence score may be used as a metric for updating the face alignment model set.

In operation 510, for each model in the face alignment model set, the at least one processor may retrieve, from a training image set having a corresponding postural angle range, ground truth shapes of the included training images as positive samples for the postural angel range. The at least one processor may further distort the ground truth shapes to generate corresponding negative samples. In some embodiments, after designating a ground truth shape as a positive sample, the at least one processor may distort the ground truth shape via transformation operations including translating, scaling, rotating, etc., to generate a corresponding negative sample. For example, parameters (distorting parameters) for distorting the ground truth shape may be expressed as $\{d_x, d_y, s_x, s_y, \theta_x, \theta_y\}$, wherein parameters $d_x$, $d_y$, $s_x$, $s_y$, $\theta_x$, $\theta_y$ are parameters for applying a translating, a scaling, and a rotating on a shape with respect to x, y coordinates of the landmarks of the shape, respectively. The at least one processor may distort a shape by:

$$S_N = S_P W(d_x, d_y, s_x, s_y, \theta_x, \theta_y), \quad \text{Equation 11}$$

wherein $S_N$ is the shape obtained after the distorting (i.e., the negative sample), $S_P$ is the shape before the distorting (i.e., the positive sample), and W is a matrix for perform the disrupting with respect to the distorting parameters $d_x$, $d_y$, $s_x$, $s_y$, $\theta_x$, and $\theta_y$. For example, W may be determined (e.g., by the at least one processor) based on the distorting parameters.

A ground truth shape may be a collection of manually marked landmarks of the corresponding training image. Each training image may associate with a ground truth shape. The training of a face alignment model (e.g., the ith candidate model) is to make a shape determined by the trained face alignment model for a face is similar to the ground truth shape of the face as much as possible.

In some embodiments, the ground truth shape may be randomly distorted to generate the negative sample. For example, $d_x$, $d_y$, $s_x$, $s_y$, $\theta_x$, and $\theta_y$ are a series of randomly determined parameters, or be determined based on randomly determined parameters.

In some embodiments, the ground truth shape may be distorted in a predetermined manner. For example, $d_x$, $d_y$, $s_x$, $s_y$, $\theta_x$, and $\theta_y$ may be a series of predetermined parameters based on a performance of the model-evaluation model with respect to the resultant projection vector.

In operation 520, for each training image of the training image set, the at least one processor may obtain shape feature vectors of the corresponding positive sample and the corresponding negative sample, respectively. The shape feature vectors may be based on HOG features (e.g., multi-scaled HOG features).

In operation 530, the at least one processor may obtain a projection vector associated with the postural angle range (or the candidate model) by performing a linear discriminant analysis (LDA) with respect to the obtained positive samples and negative samples. The at least one processor may perform the LDA based on the shape feature vectors of the positive samples and negative samples. In some embodiments, the at least one processor may use a liblinear classifier for performing a linear classification upon the shape feature vectors. The linear classification may be perform via an LDA based model. The LDA based model may be obtained by maximizing a target function J. In some embodiments, the target function J may be expressed as:

$$\max J(w) = \frac{|\tilde{u}_1 - \tilde{u}_2|^2}{\tilde{s}_1^2 + \tilde{s}_2^2}, \quad \text{Equation 11}$$

$$\tilde{u}_i = \frac{1}{N_i} \sum_{x \in X_i} w^T x, \quad \text{Equation 12}$$

$$\tilde{s}_i = \frac{1}{N_i} \sum_{x \in X_i} |w^{T}x - \tilde{u}_i|, \quad \text{Equation 13}$$

wherein w is a projection space (e.g., a linear space) to which the shape feature vectors of the positive samples and the negative samples are to be projected, $w^T$ is the projection vector to be determined, $X_i$ represents an ith ($i \in \{1, 2\}$) class while classes $X_1$ and $X_2$ respectively represent the positive samples and the negative samples, $N_i$ is the number of samples in the ith class, x is a shape feature vector of the samples in the ith class, $\tilde{u}_i$ is the mean vector of vectors (or be referred to as classified vector) obtained by projecting the shape feature vectors included in the ith class to w with $w^T$. $\tilde{s}_i$ is the within-class distance (a mean of distances from the classified vectors of the ith class to $\tilde{u}_i$) of the ith class, and $|\tilde{u}_1 - \tilde{u}_2|$ is a between-class distance between the classes $X_1$ and $X_2$. A higher between-class distance may indicate a higher separability between the classes $X_1$ and $X_2$ (or between the positive samples and the negative samples). A lower within-class distance may indicate a lower difference between any two of the classified vectors (or any two of the shape feature vectors) of the classes $X_1$ and $X_2$.

In some other embodiments, the target function J may take another form, which may be expressed as:

$$\max J(w) = \frac{\|w^T \mu_1 - w^T \mu_2\|_2^2}{w^T \Sigma_1 w + w^T \Sigma_2 w}, \quad \text{Equation 14}$$

$$\mu_i = \frac{1}{N_i} \sum_{x \in X_i} x, \quad \text{Equation 15}$$

$$\Sigma_i = \sum_{x \in X_i} (x - \mu_i)(x - \mu_i)^T, \quad \text{Equation 16}$$

wherein $\mu_i$ is the mean vector of the shape feature vectors included in the ith class. $\Sigma_i$ is a covariance matrix of the ith class, and other parameters hold the same meaning as in Equations 11, 12, and 13. The at least one processor may also use Equation 14, 15, and 16 for determining the projection vector $w^T$, and determine the between-class distance and/or the within-class distance based on the determined $w^T$.

After the projection vector associated with the ith candidate model is determined, the at least one processor may perform operation 540 at each stage of the T updating stages via the model-evaluation model (e.g., the model-evaluation model 220) to determine, based on a first shape determined by the ith candidate model at the each stage, a confidence score for the ith candidate model. It is understood that, the above projection vector and its generating process may also be implemented in an evaluation of other model for face alignment.

In operation 540, the at least one processor may perform, based on the projection vector, a vector projection on a shape feature vector of a shape (first shape) determined, by a face alignment model (candidate model) having a corresponding postural angle range, in the current shape determination stage (or model updating stage). The at least one processor may obtain (e.g., via Equation 12) a between-class distance with respect to the classified shape determined based on the shape and the projection vector, and treat the between-class distance as a metric for the confidence score of the face alignment model at the current shape determination stage.

For example, the at least one processor may determine a between-class distance $l_b$ between a first shape determined by the ith candidate model in a tth stage of the T model updating stages and the initial version of the first shape (the initial shape) associated with the ith candidate model based on a projection vector associated with the ith candidate model. The at least one processor may then determine a confidence score of the ith candidate model in the tth stage based on the determined $l_b$. For example, the at least one processor may retrieve a function C (or a look-up table) for determining a confidence score based at least on $l_b$. The lower the value of the $l_b$ is, the higher the output of the function C may be. For demonstration purposes and not intended to be limiting, the function C may take a form $e^{-l_b}$, $e^{-l_b^2}$, $ae^{-c(l_b+b)^2}$, or any other similar form (e.g., a Gaussian function).

In some embodiments, the function C may further take a within-class distance $l_w$ of the first shape determined in the tth stage based on the projection vector as another input. The lower the value of the $l_w$ is, the higher the output of the function C may be. For example, the function C may take a form $e^{-(l_b+l_w)}$, $e^{-(l_b^2+l_w^2)}$, $ae^{-c(l_b+l_w+b)^2}$, or take any other similar form.

Based on the function C, the at least one processor may determine a confidence score for each candidate model of the face alignment model set to be updated in the tth stage.

In some embodiments, the at least one processor may generate, based on a plurality of first shapes determined in the tth stage and the corresponding confidence scores, a second shape serving as an input shape of the candidate models in the t+1th stage. The first shapes for generating the second shape may be all the first shapes determined in the tth stage, or the ones determined by the remainder models of the face alignment model set in the tth stage after the updating. The at least one processor may determine, based on the corresponding confidence score, a weight for each first shape to be used for generating the second shape.

In some embodiments, the at least one processor may directly use the confidence score as the weight and determine a weighted mean of the first shapes as the second shape.

In some embodiments, the at least one processor may normalize the confidence scores of the first shapes for generating the second shape, and use the normalized confidence scores as the weights. The at least one processor may then determine a weighted sum of the first shapes as the second shape.

In some embodiments, for performing a face alignment on a test image with the model 200, during the operation 520, the at least one processor may use HOG features (multi-scaled HOG feature) determined in the training stages of a face alignment model corresponding to a postural angle range to generate the shape feature vectors of positive samples and negative samples of training images associated with the same postural angel ranges. For example, during a training phase of the model 200, whenever a HOG feature corresponding to a patch parameter causing a minimum variance is selected as the multi-scaled HOG feature of a landmark, the at least one processor may generate an association to be included in a feature index between the patch parameter (e.g., relating to a size of the patch) and the index number of the landmark. Then during the test phase of the model 200, the at least one processor may determine, based on the feature index, for each landmark of a first shape, a multi-scaled HOG feature of the each landmark that is determined in the training phase. The at least one processor may then use the determined multi-scaled HOG features to generate the shape feature vectors of the positive samples and the negative samples.

In some embodiments of the present disclosure, in the test phase of the model 200, the at least one processor may extract features based on the feature index determined in the training phase. The multi-scaled HOG feature vectors used for determining first shapes in a current stage of the T updating stages may also be used in the evaluation of models based on confidence scores in the last stage. For example, the input shape of an ith candidate model in a tth stage of the T updating stages may be a first shape determined by the ith candidate model in the t−1th stage. The shape feature vector of the first shape determined in the t−1th stage may be used in both the evaluation of the ith candidate model in the t−1th stage and the determination of a first shape in the tth stage by the ith candidate model. By such a sharing of the shape feature vectors, the computational burden of the at least one processor may be greatly reduced.

In some embodiments, in operation 140, to determine, based on at least one shape determined at the Tth stage of the T stages (updating stages) by the remainder models of the plurality of face alignment models at the T−1th stage, a result shape of the target face, the at least one processor may perform following operations.

When only one face alignment model (target model) is left in the face alignment model set in the N−1th stage (or the Tth stage) of the model 200, the at least one processor may treat the shape determined by the only one face alignment model with respect to the test image in the Nth stage as the result shape of the target face included in the test image.

When multiple face alignment models (target models) are left in the face alignment model set in the N−1th stage (or the Tth stage) of the model 200, the at least one processor may treat a weighted mean (or weighted sum) of the shapes determined by the multiple face alignment models with respect to the test image in the Nth stage as the result shape of the target face included in the test image. The at least one processor may determine weights associated with the shapes based on the confidence scores of the multiple face alignment models determined in the N−1th stage according to aforementioned approaches.

According to some embodiments of the present disclosure, a face alignment device (e.g., face alignment device 620 illustrated in FIG. 6) may be provided to perform a face alignment via the aforementioned processes (e.g., processes 100, 300, and 500). The alignment device may include a model constructing module, a confidence score determination module, an updating module, and a shape determination module.

The model constructing module may be configured to construct a plurality of face alignment models corresponding to different postural angle ranges;

The confidence score determination module may be configured to determine, when T stages of shape determination is conducted to a test image including a target face, confidence scores of shapes predicted (or determined) by the plurality of face alignment models at a current stage, wherein T is a positive integer;

The updating module may be configured to exclude at least one face alignment model, whose confidence score is lower than a predetermined threshold, from the plurality of face alignment models, and then subject remainder models of the plurality of face alignment models to a next stage of the T stages of shape determination; and The shape determination module may be configured to determine, based on at least one shape determined at the Tth stage of the T updating stages, a result shape of the target face, wherein the at least one shape is determined by the remainder models of the plurality of face alignment models at the T−1th stage.

In some embodiments, the model constructing module may include an image retrieving sub-module and a model training sub-module.

The image retrieving sub-module may be configured to obtain a plurality of training image sets corresponding to different postural angle ranges of a human face.

The model training sub-module may be configured to train, for each of the plurality of training image sets, a corresponding face alignment model via a supervised descent method (SDM) based approach.

In some embodiments, the model training sub-module may include a shape assigning unit, a feature extracting unit, a determination unit, and a modification unit.

The shape assigning unit may be configured to assign an initial shape for a face alignment model corresponding to a postural angle range, wherein the initial shape includes a plurality of landmarks.

The feature extracting unit may be configured to obtain a shape feature vector for the initial shape, wherein the shape feature vector includes histogram of oriented gradients (HOG) features associated with all the landmarks of the initial shape.

The determination unit may be configured to determine mapping matrix $W_t$ by solving a linear regression function $\Delta S_t = W_t \varphi_t(I, S_{t-1})$, wherein $\varphi_t$ is an index feature function associated with the tth stage for determining a shape feature vector of an input shape with respect to an input image, I is a matrix of the input image, $S_{t-1}$ is a shape of the t−1th level, $\Delta S_t$ is a difference between the shape $S_{t-1}$ of the tth stage and a shape $S_t$ of the tth level.

The modification unit may be configured to update the initial shape sequentially by $S_t = S_{t-1} + \Delta S_t$, and keep performing the training until a predetermined termination condition is satisfied.

In some embodiments, the feature extracting unit may be configured to: select, according to a predetermined sequence, a landmark from a first shape, and determine a plurality of candidate patches with different radii for the landmark; extract HOG features from the multi-scaled patches, and generate a plurality of HOG feature descriptors for the multi-scaled patches; determine HOG feature vectors based on the HOG feature descriptors as candidate feature vectors, and input the candidate feature vectors into at least one decision tree for conducting a feature selection, wherein the at least one decision tree may have a depth of 1; and select, via the at least one decision tree, an HOG feature corresponding to a radius causing a minimum variance of the generated feature vectors with respect to a training image set as the multi-scaled HOG feature of the landmark.

In some embodiments, the confidence score determination module may be configured to: for each model in a face alignment model set, retrieve, from a training image set having a corresponding postural angle range, ground truth shapes of the included training images as positive samples for the postural angel range, and distort the ground truth shapes to generate corresponding negative samples; for each training image of the training image set, obtain shape feature vectors of the corresponding positive sample and the corresponding negative sample, respectively, wherein the shape feature vectors are based on HOG features; obtain a projection vector associated with the postural angle range by performing a linear discriminant analysis (LDA) with respect to the obtained positive samples and negative samples; perform, based on the projection vector, a vector projection on a shape feature vector of a shape determined, by a face alignment model having a corresponding postural angle range, in the current shape determination stage; obtaining a between-class distance with respect to the classified shape determined based on the shape and the projection vector; and treat the between-class distance as a metric for the confidence score of the face alignment model at the current shape determination stage.

In some embodiments, when a HOG feature corresponding to a patch parameter causing a minimum variance is selected as the multi-scaled HOG feature of a landmark, the feature extracting unit may generate an association to be included in a feature index between the patch parameter and the index number of the landmark.

In some embodiments, to generate shape feature vectors of positive samples and negative samples of training images associated with the same postural angel ranges, the confidence score determination module may determine, based on the feature index, for each landmark of a first shape, a multi-scaled HOG feature of the each landmark that is determined in the training phase. The confidence score determination module may then use the determined multi-scaled HOG features to generate the shape feature vectors of the positive samples and the negative samples.

In some embodiments, the shape determination module may be configured to: when only one face alignment model is left in the face alignment model set in the N−1th stage, treat the shape determined by the only one face alignment model with respect to the test image in the Nth stage as the result shape of the target face included in the test image; and when multiple face alignment models are left in the face alignment model set in the N−1th stage, treat a weighted mean of the shapes determined by the multiple face alignment models with respect to the test image in the Nth stage as the result shape of the target face included in the test image.

Detailed descriptions of the face alignment device and the modules/sub-modules/units thereof may be found elsewhere in the present disclosure (e.g., in connection with FIGS. 1 to 5) and not repeated herein.

Compared to the prior arts, according to the face alignment method described in the present disclosure, when a shape of a target face included in a test image is determined using multiple face alignment models corresponding to different postural angles, at each stage of the shape determination, a confidence score may be determined for a shape predicted by each of the multiple face alignment models, and a face alignment model having a lower confidence score may be excluded, then a next stage of the shape determination may be performed accordingly. As at least one face alignment model with inferior shape determination performance is excluded in each stage of the shape determination, and only face alignment models having better shape determination performance in the last stage may be operated to perform the shape determination, the precision of the shape determination for the test image may be guaranteed, and the shape determination does not have to be performed by all the face alignment models at every stage, so that the computation burden of the face alignment method may be reduced. Issues related to traditional face alignment approaches such as heavy computational burden, high requirements on hardware, and high difficulty for implementing on mobile computing devices, may be relieved according to the face alignment method provided in the present disclosure.

Figure 6:
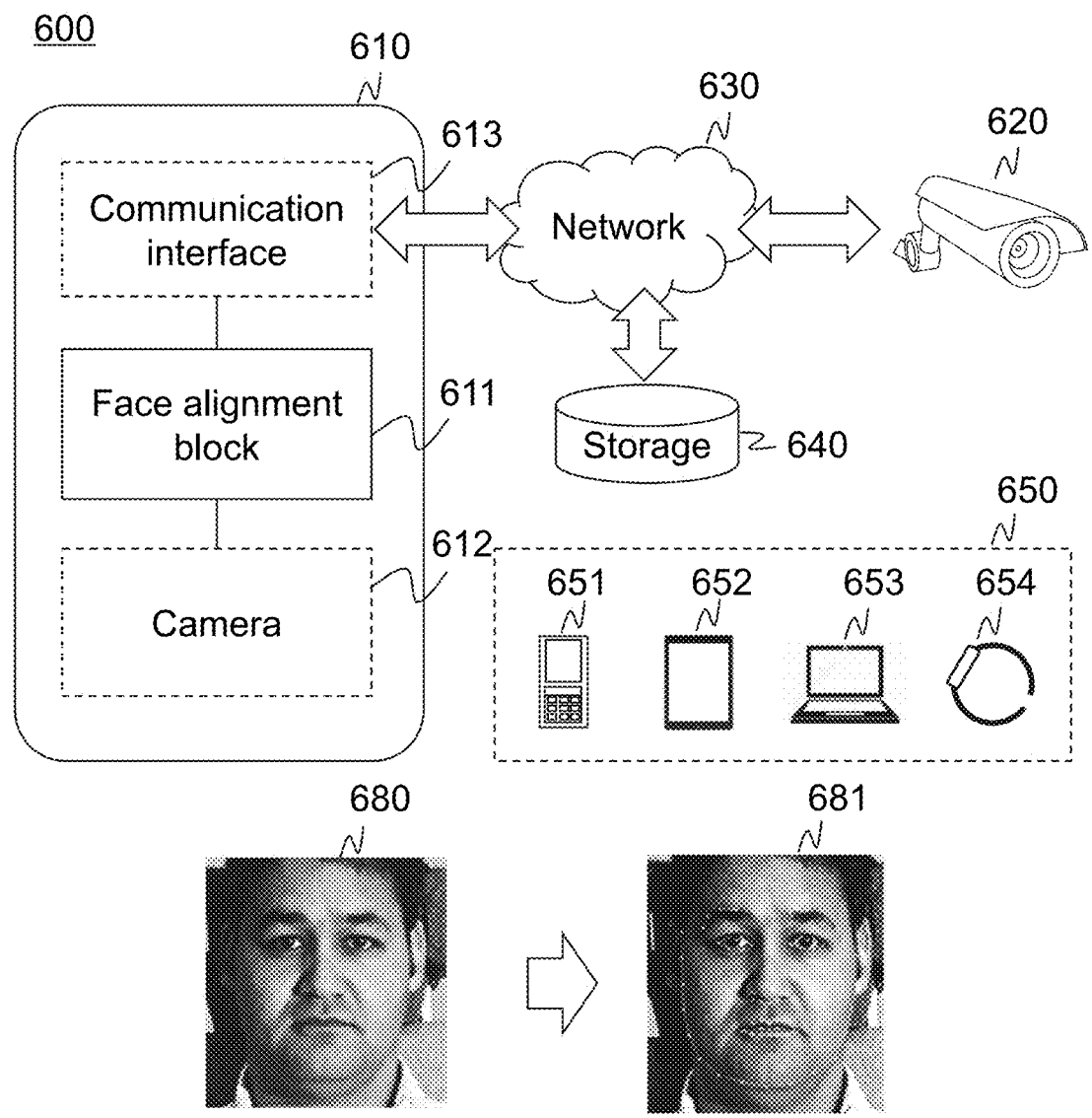
FIG. 6 is a schematic diagram illustrating an exemplary face alignment system according to some embodiments of the present disclosure.

FIG. 6 is a schematic diagram illustrating an exemplary face alignment system according to some embodiments of the present disclosure. Face alignment system 600 may include a face alignment device 610, a camera 620, a network 630, and a storage 640.

Face alignment device 610 may perform a face alignment on an image 680 (test image) including a face (target face) to determine a shape 681 (white point) for the face. The face alignment device 610 may be the face alignment device described above, and may include a face alignment block 611 for performing the face alignment via the model 200 (illustrated in FIG. 2) via process 100 illustrated in FIG. 1. The face alignment block 611 may include the modules/sub-modules/units for performing operations related to process 100. Detailed descriptions of the face alignment block 611 may be found elsewhere in the present disclosure and are not repeated herein.

In some embodiments, the face alignment device 610 may include at least one camera 612 for generating image data (e.g., a 2-dimensional image, a 3-dimensional image, a video file, a video stream) of a target scene. The face alignment device may identify a face in the image data and generate an image 680 including the face based on the image data. Alternatively or additionally, the face alignment device 610 may include a communication interface 613 for communicating with the network 630. Via the network 630, the face alignment device may receive image data from the camera 620. The camera 620 may be a camera capable of communicating with the network 630. For example, the camera 620 may be webcam, a surveillance camera, a digital camera, a telescope, or a camera for any other purpose. The face alignment device 610 may also retrieve image data form the storage device 640 via the network 630.

In some embodiments, the face alignment device 610 may provide control means for controlling the camera 620 or the camera 612 to generate image data. The face alignment device 610 may perform a face alignment via the face alignment block 611 on the generated image data in real-time. The control means may include, for example, a user interface (UI) such as a software or a mobile application, and an input device such as a keyboard, a keypad, a mouse, or a touch screen, a motion sensor, a microphone, etc. The face alignment device may include at least one processor to execute instructions for implementing the UI, and to generate control signals for controlling the camera 620 or the camera 612 based on an input of a user with respect to the UI via the input device.

The face alignment device 610 may be a desktop computer, a server, a mobile computing device 650, an in-vehicle computing device, a robotic device, an intelligence appliance, etc. The mobile computing device 650 may include a mobile phone 651, a tablet computer 652, a laptop computer 653, a wearable computing device 654 (e.g., a bracelet, a foot gear, eyeglasses, a helmet, a watch, clothing), or the like, or a combination thereof. The face alignment device 610 may also be a camera with computing capability. In some embodiments, the face alignment device 610 may be implemented by a computing device 700 as illustrated in FIG. 7, or a mobile computing device 800 illustrated in FIG. 8.

In some embodiments, the face alignment device 610 may further perform a face recognition, an expression recognition, a face tracking, a face animation, a 3D face modeling, or the like, or a combination thereof, based on the shape determined by the face alignment block 611.

The network 630 may include any suitable network that may facilitate a transmission of data and signals between the components of face alignment system 600. For example, the network 630 may facilitate a transmission of image data from the camera 620 to the face alignment device 610 and/or a transmission of control signals from the face alignment device 610 to the camera 620.

The network 630 may be and/or include one or more types of networks. For example, the network 630 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, or the like, or any combination thereof. The network 630 may also include wired and/or wireless network access points, such as base stations, internet exchange points, routers, hubs, gateways, switches, server computers, and/or any combination thereof.

The storage device 640 may store data, instructions, and/or any other information. In some embodiments, the storage device 640 may store data obtained from the camera 620, the face alignment device 610, and any other device included in the face alignment system 600 not shown in FIG. 6. For example, the storage device 640 may store data and/or instructions that the face alignment device 610 may execute or use to perform exemplary methods described in the present disclosure. The storage device 640 may include a mass storage device, a removable storage device, a volatile read-and-write memory, a read-only memory (ROM), or the like, or any combination thereof. In some embodiments, the storage device 640 may be implemented on a cloud platform.

It should be noted that the above description about the face alignment system 600 is only for illustration purposes and not intended to be limiting. It is understood that, after learning the major concept of the present disclosure, a person of ordinary skill in the art may alter the face alignment system 600 in an uncreative manner. The alteration may include combining and/or splitting modules or sub-modules, adding or removing optional modules or sub-modules, etc. All such modifications are within the protection range of the present disclosure.

FIG. 7 is a schematic diagram illustrating an exemplary computing device. Computing device 700 may be configured to implement the face alignment device 610 and perform one or more operations disclosed in the present disclosure. The computing device 700 may include a bus 770, a processor 710, a read only memory (ROM) 730, a random access memory (RAM) 740, a storage device 720 (e.g., massive storage device such as a hard disk, an optical disk, a solid-state disk, a memory card, etc.), an input/output (I/O) port 750, and a communication interface 760 (e.g. the communication interface 613). It may be noted that, the architecture of the computing device 700 illustrated in FIG. 7 is only for demonstration purposes, and not intended to be limiting. The computing device 700 may be any device capable of performing a computation.

In some embodiments, the computing device 700 may be a single device. Alternatively, the computing device 700 may include a plurality of computing devices having a same or similar architecture as illustrated in FIG. 7, and one or more components of the computing device 700 may be implemented by one or more of the plurality of computing devices.

The bus 770 may couple various components of computing device 700 and facilitate transferring of data and/or information between them. The bus 770 may have any bus structure in the art. For example, the bus 770 may be or may include a memory bus and/or a peripheral bus.

The I/O port 750 may allow a transferring of data and/or information between the bus 770 and one or more peripheral device (e.g., one or more cameras 220, one or more input devices (e.g., a keyboard, a mouse, a joystick, a microphone), one or more output devices (e.g., a display, a loudspeaker, a printer)). The I/O port 750 may include a USB port, a COM port, a PS/2 port, an HDMI port, a VGA port, a video cable socket such as an RCA sockets and a Mini-DIN socket, a coaxial cable port (e.g., for implementing a POC technique), or the like, or a combination thereof.

The communication interface 760 may allow a transferring of data and/or information between the network 630 and the bus 770. For example, the communication interface 760 may be or may include a network interface card (NIC), a Bluetooth™ module, an NFC module, etc.

The ROM 730, the RAM 740, and/or the storage device 720 may be configured to store computer readable instructions that may be executed by the processor 710. The RAM 740, and/or the storage device 720 may store date and/or information obtained from a peripheral device (e.g., one or more cameras 220) and/or the network 150/260. The RAM 740, and/or the storage device 720 may also store date and/or information generated by the processor 710 during the execution of the instruction.

The processor 710 may be or include any processor in the art configured to execute computer readable instructions (e.g., stored in the ROM 730, the RAM 740, and/or the storage device 720), so as to perform one or more operations or implement one or more modules/units disclosed in the present disclosure. For example, the processor 710 may perform a face alignment in a process illustrated in FIG. 1.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

FIG. 8 is a schematic diagram illustrating an exemplary mobile computing device. As illustrated in FIG. 8, the mobile computing device 800 may include a communication platform 860, a display 870, a graphic processing unit (GPU) 871, a processor 872, an I/O 873, a memory 880, and a storage device 875. In some embodiments, any other suitable component, including but not limited to a system bus or a controller (not shown), may also be included in the mobile computing device 800. In some embodiments, a mobile operating system 881 (e.g., iOS™, Android™' Windows Phone™) and one or more applications 882 may be loaded into the memory 880 from the storage 875 in order to be executed by the processor 872 or the GPU 871. The applications 882 may include applications programmed for implementing operations and modules described in the present disclosure, such as process 100 and related operations.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A system for face alignment, comprising:
   a storage medium, including a set of instructions; and
   at least one processor in communication with the storage medium, when executing the set of instructions, the at least one processor is configured to cause the system to:
   obtain a test image including a target face;
   obtain an image processing model set including M candidate models, wherein M is an integer greater than 2, and each model of the M candidate models is trained for determining a shape of a face having a postural angle within a predetermined postural angle range, and the each model is trained with a training image set corresponding to the predetermined postural angle range;
   determine a candidate model from the image processing model set as a target model; and
   determine, based on the target model, a result shape as a shape of the target face.

2. The system of claim 1, wherein to determine a candidate model from the image processing model set as a target model, the at least one processor is further configured to cause the system to:
   conduct T stages of model set updating operation, wherein T is a positive integer, and in each stage of the T stages of model set updating operation:
   conduct a first performance evaluation to each candidate model of the image processing model set with respect to the test image; and
   update the image processing model set by excluding at least one model from the image processing model set based on the first performance evaluation.

3. The system of claim 2, wherein an ith candidate model of the M candidate models includes $K_i$ levels, wherein i is an integer between 1 and M, $K_i$ is an integer corresponding to the ith candidate model and equal to or greater than T+1, and first T levels of the $K_i$ levels respectively correspond to the T stages of model set updating operation;
   a first level of the $K_i$ level is configured to modify a first shape towards the shape of the target face;
   each subsequent level of the $K_i$ levels is configured to modify the first shape of a previous level towards the shape of the target face; and
   the modified first shape is the first shape of a current level.

4. The system of claim 3, wherein to conduct the first performance evaluation in a stage of the T stages, the at least one processor is further configured to cause the system to:
   for each candidate model of the image processing model set:
   operate a corresponding layer of the candidate model to determine a corresponding first shape associated with the target face; and determine a confidence score based on the first shape.

5. The system of claim 4, wherein in a stage of the T stages, to exclude the at least one model from the image processing model set based on the first performance evaluation, the at least one processor is further configured to cause the system to:
identify at least one candidate model from the image processing model set that has the confidence score matching a predefined rule associate with the stage; and
exclude the at least one candidate model from the image processing model set.

6. The system of claim 4, wherein to determine a confidence score of the first shape in a stage of the T stages, the at least one processor is further configured to cause the system to:
determine a difference between the first shape and an original version of the first shape; and
determine the confidence score of the first shape based on the difference.

7. The system of claim 6, wherein to determine a difference between the first shape and the original version of the first shape, the at least one processor is further configured to cause the system to:
retrieve a projection vector associated with the each candidate model;
determine, based on the projection vector, a between-class distance between feature vectors of the first shape and the original version of the first shape; and
treat the between-class distance as the difference between the first shape and the original version of the first shape.

8. The system of claim 3, wherein to conduct a stage of model set updating operation, the at least one processor is further configured to cause the system to:
obtain the first shape corresponding to each candidate model of the image processing model set;
obtain a weight associated with the each of the first shape;
obtain a second shape corresponding to the stage by determining, based on the obtained weights and the obtained first shapes, a weighted mean of the first shapes; and
treat the second shape as an input to the image processing model set in a next stage of the T stages of model set updating operation.

9. The system of claim 8, wherein the at least one processor is further configured to cause the system to determine the weight associated with the each of the first shape by:
determining, based on the first performance evaluation of the each of the candidate model, the weight associated with the corresponding first shape.

10. The system of claim 8, wherein:
the second shape includes a plurality of first landmarks; and
to modify the first shape in a stage of the T stages of model set updating operation via the ith candidate model, the at least one processor is further configured to cause the system to:
for each of the plurality of first landmarks,
generate a first feature vector by extracting features from a patch associated with the each of the plurality of first landmarks, wherein the patch is a part of the test image;
generate a second feature vector by concatenating the first feature vectors;
determine a shape increment based on the second feature vector; and
modify the first shape based on the shape increment.

11. The system of claim 10, wherein the at least one processor is further configured to cause the system to:
obtain a feature index associated with the first shape; and
for each of the plurality of first landmarks:
determine, based on the feature index, the patch on the test image associated with the each of the plurality of first landmarks, wherein
the feature index includes an association between the first landmark and a shape or size of the patch.

12. The system of claim 11, wherein the at least one processor is further configured to cause the system to generate the feature index by:
retrieving a training dataset including training images;
obtaining a set of candidate patch parameters associated with the shape or size of a patch; and
for each first landmark of the plurality of first landmarks:
conducting a second performance evaluation of the set of candidate patch parameters for the each first landmark with respect to the training images using an evaluation model, wherein the evaluation model evaluates the candidate patch parameters based on an invariance of first feature vectors resulting from each of the set of candidate patch parameters;
selecting, based on the second performance evaluation, a target patch parameter from the set of candidate patch parameters for the each first landmark; and
generating an association to be included in the feature index between the target patch parameter and the first landmark.

13. The system of claim 12, wherein:
the evaluation model includes at least one decision tree; and
the at least one processor is further configured to cause the system to conduct the second performance evaluation by training the at least one decision tree using a maximum variance reduction approach.

14. The system of claim 10, wherein the features extracted for generating the first feature vector are histogram of oriented gradient (HOG) based features.

15. The system of claim 10, wherein the at least one processor is further configured to cause the system to:
obtain a feature index associated with the first shape;
for each of the plurality of first landmarks:
determine, based on the feature index, a feature type associated with the first landmark, wherein
the feature index includes an association between the first landmark and the feature type; and
a type of the features extracted from the associated patch for generating the first feature vector of the first landmark is the determined feature type.

16. The system of claim 3, wherein the ith candidate model of the M candidate models is trained using a supervised descent method (SDM) based approach.

17. The system of claim 3, wherein to conduct the T stages of model set updating operation, the at least one processor is further configured to cause the system to:
for each candidate model of the image processing model set:
obtain the first shape corresponding to the candidate model; and
treat the first shape as an input to the candidate model in a next stage of the T stages of model set updating operation.

18. A method for face alignment, implemented on at least one device each of which has at least one processor and storage, the method comprising:
- obtaining, by the at least one processor, a test image including a target face;
- obtaining, by the at least one processor, an image processing model set including M candidate models, wherein M is an integer greater than 2, and each model of the M candidate models is trained for determining a shape of a face having a postural angle within a predetermined postural angle range, and the each model is trained with a training image set corresponding to the predetermined postural angle range;
- determining a candidate model from the image processing model set as a target model; and
- determining, by the at least one processor based on the target model, a result shape as a shape of the target face.

19. The method of claim 18, wherein the determining a candidate model from the image processing model set as a target model further comprises:
- conducting T stages of model set updating operation, wherein T is a positive integer, and in each stage of the T stages of model set updating operation:
  - conducting a first performance evaluation to each candidate model of the image processing model set with respect to the test image; and
  - updating the image processing model set by excluding at least one model from the image processing model set based on the first performance evaluation.

20. A non-transitory computer readable medium, storing instructions, the instructions when executed by a processor, causing the processor to execute operations comprising:
- obtaining, by the at least one processor, a test image including a target face;
- obtaining an image processing model set including M candidate models, wherein M is an integer greater than 2, and each model of the M candidate models is trained for determining a shape of a face having a postural angle within a predetermined postural angle range, and the each model is trained with a training image set corresponding to the predetermined postural angle range;
- determining a at least one candidate model from the image processing model set as a target model; and
- determining, based on the target model, a result shape as a shape of the target face.

* * * * *